US008651432B2

(12) United States Patent
De Roche

(10) Patent No.: US 8,651,432 B2
(45) Date of Patent: Feb. 18, 2014

(54) AIR-VEHICLE INTEGRATED KINESTHETIC CONTROL SYSTEM

(75) Inventor: Mark Stephen De Roche, Playa del Rey, CA (US)

(73) Assignee: Aerofex, Inc., Manhattan Beach, CA (US)

( * ) Notice: Subject to any disclaimer, the term of this patent is extended or adjusted under 35 U.S.C. 154(b) by 293 days.

(21) Appl. No.: 13/277,326

(22) Filed: Oct. 20, 2011

(65) Prior Publication Data

US 2012/0032032 A1   Feb. 9, 2012

Related U.S. Application Data

(63) Continuation-in-part of application No. 11/900,147, filed on Sep. 10, 2007, now Pat. No. 8,056,866, and a continuation-in-part of application No. 12/793,590, filed on Jun. 3, 2010, now Pat. No. 8,413,932.

(60) Provisional application No. 60/848,258, filed on Sep. 28, 2006, provisional application No. 61/342,210, filed on Apr. 10, 2010, provisional application No. 61/455,821, filed on Oct. 27, 2010, provisional application No. 61/571,509, filed on Jun. 25, 2011, provisional application No. 61/574,134, filed on Jul. 28, 2011, provisional application No. 61/575,227, filed on Aug. 17, 2011.

(51) Int. Cl.
*B64C 13/04*   (2006.01)

(52) U.S. Cl.
USPC ............ 244/221; 244/223; 244/224; 244/220

(58) Field of Classification Search
USPC .......... 244/6, 7 A, 7 B, 12.1, 12.2, 12.3, 12.5, 244/12.4, 13, 17.254, 23 R, 23 A, 23 C, 23 D, 244/23 B, 220, 221, 223, 224
See application file for complete search history.

(56) References Cited

U.S. PATENT DOCUMENTS

| | | | |
|---|---|---|---|
| 2,417,896 A | * | 3/1947 | Zimmerman .............. 244/17.15 |
| 2,953,321 A | | 9/1960 | Robertson et al. |
| 2,955,780 A | | 10/1960 | Hulbert |

(Continued)

OTHER PUBLICATIONS

T.W. Sheehy, Computer Aided Shrouded Propeller Design, AIAA 9th Annual Meeting and Technical Display, Jan. 8-10, 1973, pp. 1-6, Washington, D.C.

(Continued)

*Primary Examiner* — Tien Dinh
*Assistant Examiner* — Justin Benedik
(74) *Attorney, Agent, or Firm* — Patent Law Office of David G. Beck

(57) ABSTRACT

A lift platform with a kinesthetic control system that is coupled to means for altering air flow through the first and second longitudinally-spaced ducts comprising the lift platform is provided. The control system includes a control handle bar with left and right hand grips, and first and second control roll bars located on either side of the lift platform's central cowling. Forward/rearward movement of the control handle bar from a neutral position generates nose-down/nose-up pitching moments, respectively; counterclockwise/clockwise movement of the control handle bar from the neutral position generates counterclockwise rotation/clockwise rotation of the lift platform about a lift platform vertical centerline; and left movement/right movement of the control roll bars generates left roll/right roll moments about the lift platform roll axis.

20 Claims, 29 Drawing Sheets

(56) References Cited

U.S. PATENT DOCUMENTS

| | | | |
|---|---|---|---|
| 3,184,183 A | | 5/1965 | Plasecki |
| 3,726,497 A | * | 4/1973 | Gannett et al. ............... 244/234 |
| 5,738,302 A | * | 4/1998 | Freeland ..................... 244/23 R |
| 5,890,441 A | * | 4/1999 | Swinson et al. ............. 244/12.3 |
| 6,464,166 B1 | | 10/2002 | Yoeli |
| 6,488,232 B2 | | 12/2002 | Moshier |
| 6,550,563 B2 | | 4/2003 | Velke et al. |
| 6,659,403 B2 | | 12/2003 | Hsia |
| 6,745,977 B1 | * | 6/2004 | Long et al. ........................ 244/2 |
| 6,817,570 B2 | | 11/2004 | Yoeli |
| 6,883,748 B2 | * | 4/2005 | Yoeli ............................ 244/12.3 |
| 6,886,776 B2 | | 5/2005 | Wagner et al. |
| 6,892,979 B2 | | 5/2005 | Milde, Jr. |
| 7,188,803 B2 | * | 3/2007 | Ishiba ......................... 244/23 R |
| 7,249,732 B2 | * | 7/2007 | Sanders et al. .............. 244/23 A |
| 7,275,712 B2 | * | 10/2007 | Yoeli ............................ 244/23 A |
| 7,484,687 B2 | | 2/2009 | Martin |
| 7,789,342 B2 | * | 9/2010 | Yoeli ............................ 244/23 B |
| 2004/0104303 A1 | * | 6/2004 | Mao .............................. 244/12.5 |
| 2005/0230524 A1 | * | 10/2005 | Ishiba ......................... 244/23 A |
| 2007/0262195 A1 | * | 11/2007 | Bulaga et al. ................ 244/12.4 |
| 2008/0054121 A1 | * | 3/2008 | Yoeli ............................ 244/12.1 |
| 2009/0140102 A1 | * | 6/2009 | Yoeli ............................ 244/23 D |
| 2010/0270419 A1 | * | 10/2010 | Yoeli ............................ 244/12.1 |

OTHER PUBLICATIONS

P.M. Bevilaqua, Advances in Ejector Thrust Augmentation, Dec. 1987, pp. 375-405, SAE International.

J. Fleming et al., Improved Control of Ducted Fan VTOL UAVs in Crosswind Turbulence, AHS 4$^{th}$ Decennial Specialist's Conference on Aeromechanics, Jan. 21-23, 2004, pp. 1-12, San Francisco, CA.

J. Fleming et al., Improving Control System Effectiveness for Ducted Fan VTOL UAVs Operating in Crosswinds, 2$^{nd}$ AIAA Unmanned Unlimited Systems, Technologies, and Operations-Aerospace, Sep. 15-18, 2003, pp. 1-11, San Diego, CA.

P.J. Vermeulen et al., Air Ejector Pumping Enhancement Through Pulsing Primary Flow, 2$^{nd}$ AIAA Flow Control Conference, Jun. 28-Jul. 1, 2004, pp. 1-9, Portland, OR.

R.J. Weir, Aerodynamic Design Considerations for a Free-Flying Ducted Propeller, AIAA Atmospheric Flight Mechanics Conference, Aug. 15, 1988, pp. 420-431, Minneapolis, MN.

P.G. Parikh et al., Resonant Entrainment of a Confined Pulsed Jet, J. Fluids Eng., Dec. 1982, pp. 482-491, vol. 104, Issue 4.

K.S. Nagaraja, Advances in Ejector Technology—A Tribute to Hans von Ohain's Vision, Final Report from Air Force Wright Aeronautical Labs Wright-Patterson AFB, Jun. 1982, pp. 490-517.

H.S. Fowler, Thrust Systems for Light Air Cusion Vehicles, 1974, pp. 1-40.

Zimmerman Flying Platform, http://www.nasm.si.edu/research/aero/aircraft/zimmerman.htm, Sep. 4, 2007, pp. 1-2.

Hiller Flying Platform (Model 1031-A-1), http://www.nasm.si.edu/research/aero/aircraft/hiller.htm, Sep. 4, 2007, pp. 1-3.

The De Lackner Aerocycle—An Early "Flying Platform", http://www.transchool.eustis.army.mil/Museum/DeLacker.htm, Sep. 4, 2007, pp. 1-3.

Robb, Driving on Air: 20$^{th}$ Century Flying Carpets, Vertiflite, Spring 2005, pp. 2-11.

History—Flying Geeps—Model PA-59N, http://www.piasecki.com/pa-59n.htm, Sep. 4, 2007, p. 1.

Robertson, Designing and Testing the Hiller Platform, Aero Digest, Nov. 1955, pp. 22-26.

The Sky-High Invention, http://www.howtoadvice.com/Sky-High, Sep. 4, 2007, pp. 1-11.

And Now for Something Really Unusual . . . the 1955 de Lackner CH-4 Heli-Vector Prototype, http://findarticles.com/p/articles/mi_qa3897/is_200110/ai_n8968912, Sep. 4, 2007, pp. 1-3.

* cited by examiner

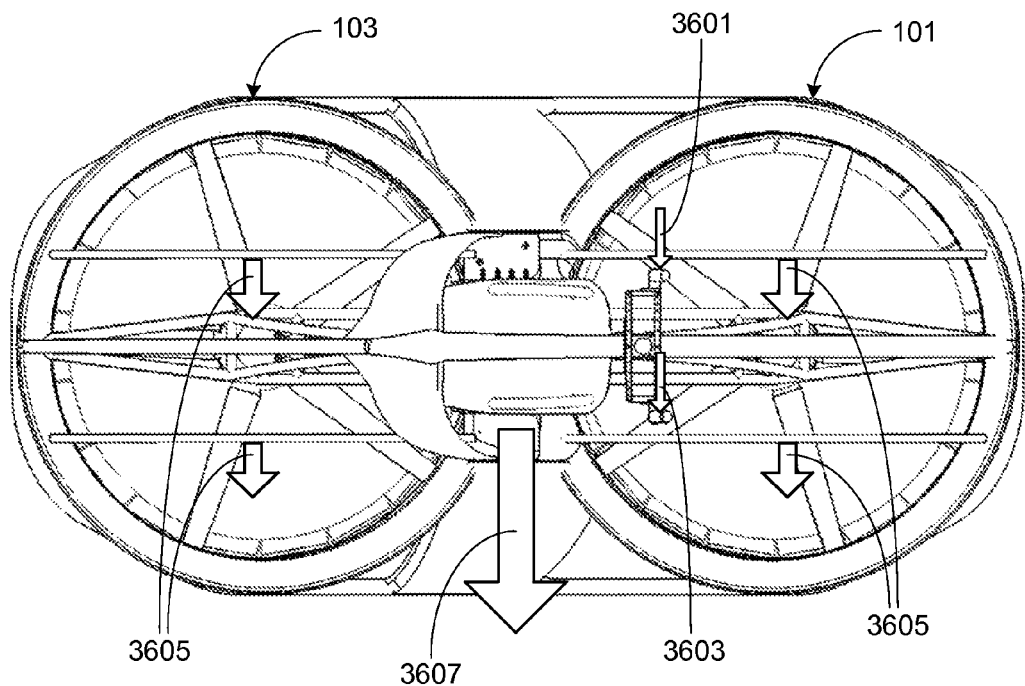
FIG. 36A
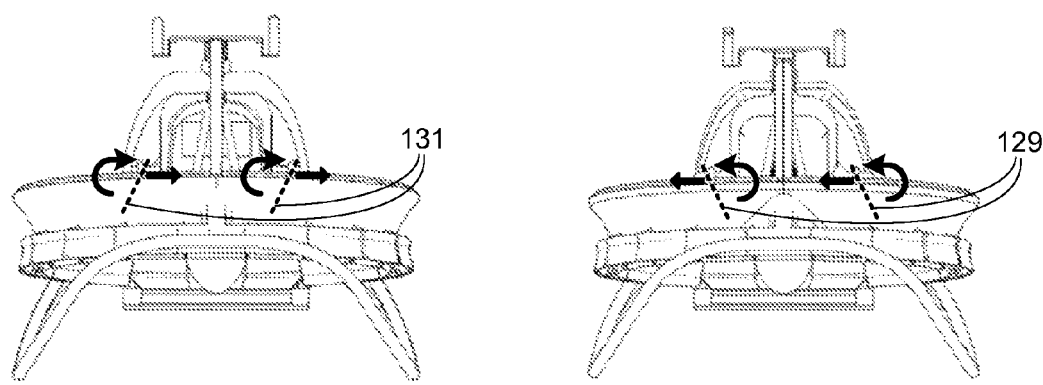
FIG. 36B
FIG. 36C

AIR-VEHICLE INTEGRATED KINESTHETIC CONTROL SYSTEM

CROSS-REFERENCE TO RELATED APPLICATION

This application is a continuation-in-part of U.S. patent application Ser. No. 11/900,147, filed 10 Sep. 2007, which claims the benefit of the filing date of U.S. Provisional Patent Application Ser. No. 60/848,258, filed 28 Sep. 2006, the disclosures of which are incorporated herein by reference for any and all purposes. This application is also a continuation-in-part of U.S. patent application Ser. No. 12/793,590, filed 3 Jun. 2010, which claims the benefit of the filing date of U.S. Provisional Patent Application Ser. No. 61/342,210, filed 10 Apr. 2010, the disclosures of which are incorporated herein by reference for any and all purposes. This application claims the benefit of the filing date of U.S. Provisional Patent Application Ser. Nos. 61/455,821, filed 27 Oct. 2010, 61/571,509, filed 25 Jun. 2011, 61/574,134, filed 28 Jul. 2011, and 61/575,227, filed 17 Aug. 2011, the disclosures of which are incorporated herein by reference for any and all purposes.

FIELD OF THE INVENTION

The present invention relates generally to powered lift platforms and, more particularly, to an augmented kinesthetic control system for use with a powered lift platform.

BACKGROUND OF THE INVENTION

An aircraft kinesthetic control system uses the intuitive balancing capability of the pilot to stabilize the aircraft as well provide a means of directional control, thereby reducing and/or eliminating the complex, non-intuitive control systems typically used to provide aircraft control. Thus kinesthetic control systems offer the promise of minimizing pilot training and providing flight opportunities to non-classically trained personnel.

U.S. Pat. No. 2,417,896 discloses an early flying craft that utilizes a kinesthetic control system. As disclosed, the flying craft uses a pair of duct-enclosed, motor driven propellers. The ducts are linked together in such a way as to maintain duct spacing while still allowing the ducts to be freely, and independently, angled. During operation and flight, the pilot stands on top of the pair of ducted propellers, placing one foot on each of a pair of support plates, the support plates being mounted to the top of each of the duct housings. Additional craft control is provided by a pair of hand-held controls which provide independent control of the speed of the two engines and/or the pitch of the two propellers.

U.S. Pat. No. 2,953,321 discloses another flying craft utilizing a kinesthetic control system, this craft using a pair of axially-aligned, counter-rotating propellers. The pilot station is positioned over the cylindrical propeller housing and along the longitudinal axis of the craft, thereby minimizing pilot effort when controlling craft flight. The pilot also controls the engine output, and thus the thrust of the craft, in order to control ascent, descent and horizontal speed.

Although a variety of flying crafts have been designed which employ kinesthetic control systems, their weight and subsequent utility are limited. Accordingly, what is needed in the art is a powered lift platform with an effective kinesthetic control system. The present invention provides such a system.

SUMMARY OF THE INVENTION

The present invention provides a lift platform with a kinesthetic control system that is coupled to means for altering air flow through the first and second longitudinally-spaced ducts comprising the lift platform, where the first and second lift planes defined by the rotors within the first and second ducts are positioned below the lift platform's center of gravity. The control system includes a control handle bar comprising a linkage assembly, a left hand grip and a right hand grip slaved to the left hand grip; and first and second control roll bars rigidly fixed to one another and located on either side of the lift platform's central cowling. Forward movement of the control handle bar from a neutral position generates a nose-down pitching moment; rearward movement of the control handle bar from the neutral position generates a nose-up pitching moment; counterclockwise movement of the control handle bar from the neutral position generates a counter-clockwise rotation of the lift platform about a lift platform vertical centerline; and clockwise movement of the control handle bar from the neutral position generates a clockwise rotation of the lift platform about the lift platform vertical centerline. Movement of the left and right control roll bars in a left direction from the roll bar neutral position generates a roll left moment about a lift platform roll axis while movement of the left and right control roll bars in a right direction from the roll bar neutral position generates a roll right moment about a lift platform roll axis.

In one aspect, the means for altering air flow is comprised of a first airflow augmentation system corresponding to the platform's first duct and a second airflow augmentation system corresponding to the platform's second duct, where each of the airflow augmentation systems comprise inner and outer cowling members mounted adjacent to the inside and outside surfaces of the corresponding fan duct, respectively, and a plurality of actuators. The inner cowl is mounted within the downwash of the propeller and the trailing edges of both the inner and outer cowling members extend below the trailing edge of the duct. Each actuator is mounted between the trailing edges of the inner and outer cowling members and may be positioned between an open position and a closed position, wherein an actuator in the open position provides minimal profile to airflow passing between the inner cowling member and the duct, and wherein an actuator in the closed position redirects airflow entering between the inner cowling member and the duct outboard between the outer cowling member and the duct. Preferably the actuators are grouped by ejector control section, where each ejector control section is comprised of a portion of the inner cowling, a portion of the outer cowling, and cowling stand-offs at either section end. The actuators may be curvilinear where the cylindrical axis corresponding to the curvilinear shape may be parallel to the downward vector corresponding to the primary airflow when the actuator is in the open position. The actuators may be comprised of a first actuator surface hingeably coupled to the inner cowling member and a second actuator surface hingeably coupled to the outer cowling member. The system may further comprise a control system coupled to the plurality of actuators and the control handle bar, such that forward movement of the control handle bar causes a first subset of the plurality of actuators to close and rearward movement of the control handle bar causes a second subset of the plurality of actuators to close, where the first subset corresponds to the first, forward duct (e.g., located forward of the first rotor centerline) and the second subset corresponds to the second, aft duct (e.g., located aft of the second rotor centerline). The system may further comprise a control system coupled to the plurality of actuators and the first and second control roll bars, such that movement of the roll bars in a left direction causes a first subset and a second subset of the plurality of actuators to close and movement of the roll bars in a right direction causes a third subset and a fourth subset of the plurality of actuators to close, where the first subset corresponds to the first, forward duct (e.g., left of the lift platform centerline), the second subset corresponds to the second, aft duct (e.g., left of the lift platform centerline), the third subset corresponds to the first, forward duct (e.g., right of the lift platform centerline), and the fourth subset corresponds to the second, aft duct (e.g., right of the lift platform centerline). The system may further comprise a control system coupled to the plurality of actuators and to the left and right hand grips, where the hand grips are pivotable in a left direction and in a right direction relative to the lift platform centerline, where pivoting the left and right hand grips in a left direction causes a first subset and a second subset of the plurality of actuators to close and pivoting the left and right hand grips in a right direction causes a third subset and a fourth subset of the plurality of actuators to close, where the first subset corresponds to the first, forward duct (e.g., left of the lift platform centerline), the second subset corresponds to the second, aft duct (e.g., left of the lift platform centerline), the third subset corresponds to the first, forward duct (e.g., right of the lift platform centerline), and the fourth subset corresponds to the second, aft duct (e.g., right of the lift platform centerline).

In one aspect, the means for altering air flow is comprised of at least a pair of rotatable fore-mounted longitudinal control surfaces mounted above the first duct (e.g., on either side of the lift platform centerline) and at least a pair of aft-mounted rotatable longitudinal control surfaces mounted above the second duct (e.g., on either side of the lift platform centerline). The system may further comprise a control system coupled to the fore- and aft-mounted longitudinal control surfaces and to the control handle bar, where counterclockwise movement of the control handle bar causes a leading edge of the fore-mounted longitudinal control surfaces to rotate to the left and causes a leading edge of the aft-mounted longitudinal control surfaces to rotate to the right, and where clockwise movement of the control handle bar causes the leading edge of the fore-mounted longitudinal control surfaces to rotate to the right and causes the leading edge of the aft-mounted longitudinal control surfaces to rotate to the left. The system may further comprise a control system coupled to the fore- and aft-mounted longitudinal control surfaces and to the left and right hand grips, where the hand grips are pivotable in a left direction and in a right direction relative to the lift platform centerline, where pivoting the left and right hand grips in a left direction causes the leading edge of the fore- and aft-mounted longitudinal control surfaces to rotate to the left, and where pivoting the left and right hand grips in a right direction causes the leading edge of the fore- and aft-mounted longitudinal control surfaces to rotate to the right.

In one aspect, the system may further comprise a drive system coupled to the first and second rotors, a throttle controller coupled to the drive system and mounted to at least one of the left and right hand grips, a pair of foot support plates, and where the central cowling defines a pilot seating region.

In one aspect, the system may further comprise a first roll bar linkage assembly coupled to the first control roll bar and that passes through a left side of the central cowling to position the first control roll bar at approximately pilot knee height, and a second roll bar linkage assembly coupled to the second control roll bar and that passes through a right side of the central cowling to position the second control roll bar at approximately pilot knee height.

In one aspect, the linkage assembly of the control handle bar further comprises a pair of leading arms and a pair of trailing arms, where the linkage assembly prevents that angle of the left and right hand grips relative to the plane of the lift platform from varying as the control handle bar is moved forward and rearward from the neutral position.

In one aspect, the linkage assembly of the control handle bar further comprises a leading yaw link, a trailing yaw link, a left side link to which the left hand grip is affixed, and a right side link to which the right hand grip is affixed, where the linkage assembly prevents left and right hand grip rotation as the control handle bar is moved counterclockwise from the neutral position and clockwise from the neutral position.

A further understanding of the nature and advantages of the present invention may be realized by reference to the remaining portions of the specification and the drawings.

BRIEF DESCRIPTION OF THE DRAWINGS

FIG. 36A provides a top view of the lift platform, this view showing a translate right input command and the resultant response;

FIG. 36B provides an aft view of the lift platform shown in FIG. 36A; and

FIG. 36C provides a fore view of the lift platform shown in FIG. 36A.

DESCRIPTION OF THE SPECIFIC EMBODIMENTS

In the following text, the terms "center-of-gravity" and "CG" may be used interchangeably. Similarly, the terms "propeller" and "fan" may be used interchangeably herein. Note that identical element symbols used on multiple figures refer to the same component, or components of equal functionality. Additionally, the accompanying figures are only meant to illustrate, not limit, the scope of the invention and should not be considered to be drawn to scale.

The preferred embodiment of the present invention is comprised of three subsystems; a plurality of peripheral control ejectors that are primarily used to provide pitch and roll control, a set of longitudinal control surfaces that are primarily used for yaw control, and a pilot interface. Following a brief summary of the overall system, each of these subsystems will be described in detail. It will be appreciated by those of skill in the art that while these subsystems are preferably used in a combined system, each subsystem may be used in conjunction with other subsystems. For example, the pilot interface may be used with other aerodynamic control subsystems.

Figure 1:
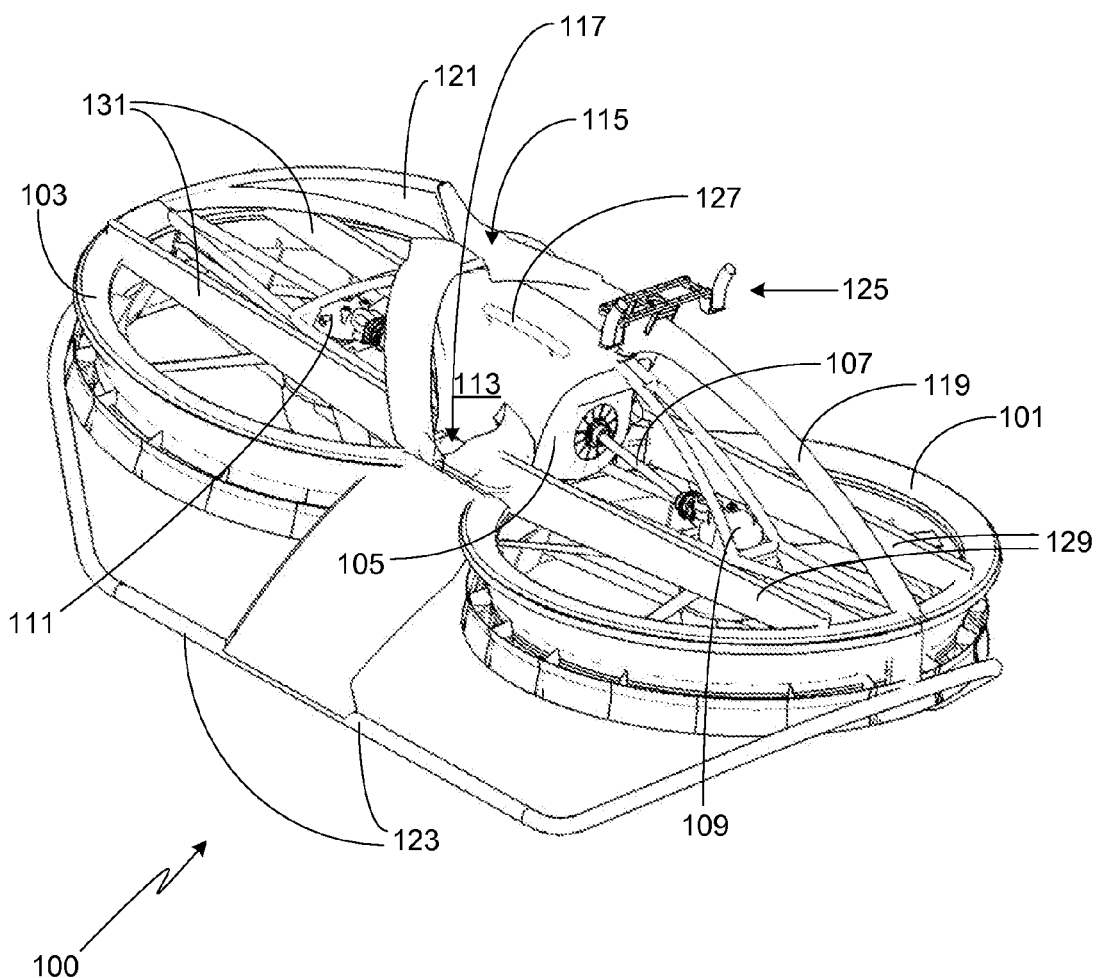
FIG. 1 provides a perspective view of a lift platform in accordance with a preferred embodiment of the invention.
Figure 2:
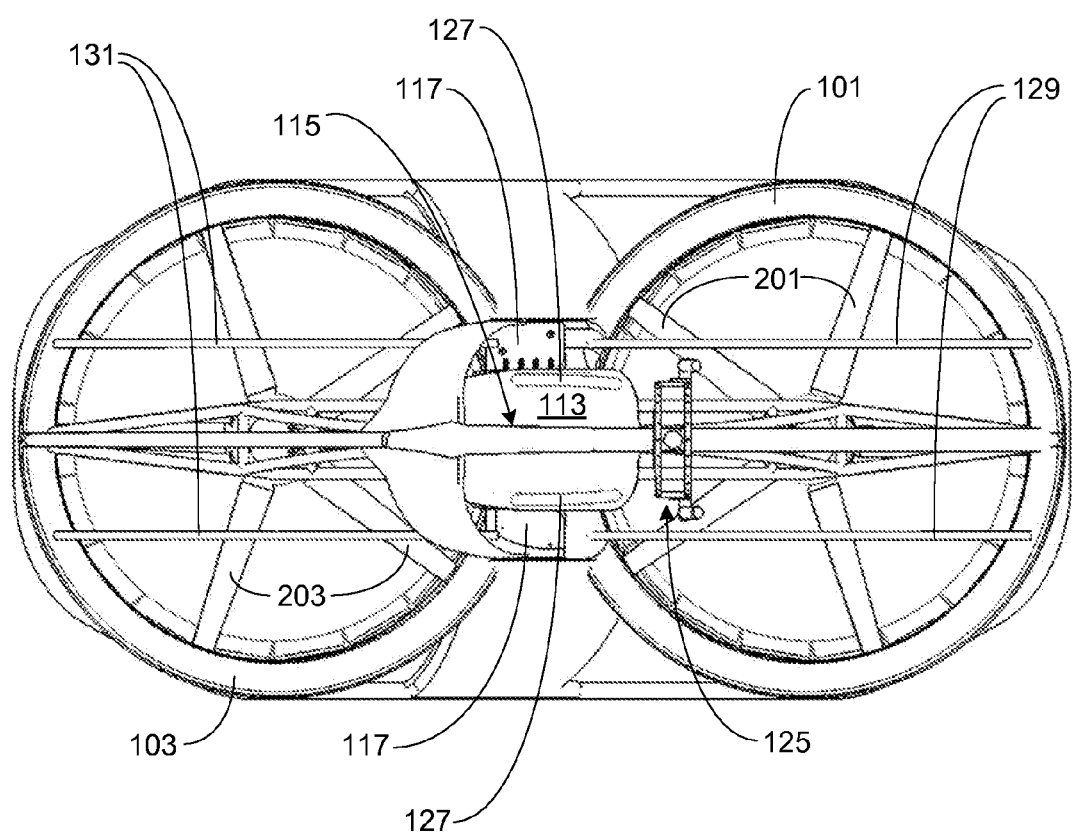
FIG. 2 provides a top view of the lift platform shown in FIG. 1.
Figure 3:
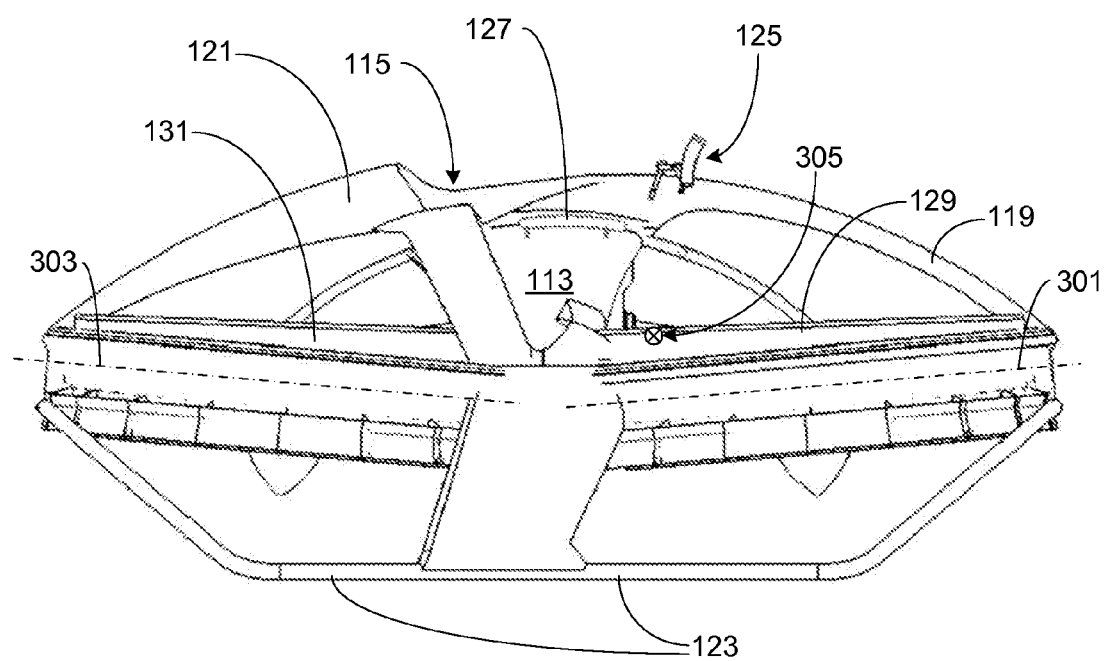
FIG. 3 provides a side view of the lift platform shown in FIGS. 1 and 2.

FIG. 1 provides a perspective view of a lift platform 100 in accordance with a preferred embodiment of the invention. FIGS. 2 and 3 provide top and side views, respectively, of lift platform 100.

Platform 100 includes a pair of thrust generating regions located in fore and aft positions within the vehicle. In the preferred and illustrated embodiment, thrust is generated by a pair of tandem-mounted, counter-rotating rotors 201/203 mounted within forward duct 101 and aft duct 103, respectively, the ducts required for operation of the preferred aerodynamic control system utilizing peripheral control ejectors. In addition to their use in the control system, the ducts provide enhanced thrust for a given rotor size, thus allowing the use of smaller rotors. As a result of being able to use smaller rotors for the required vehicle thrust, the rotors can turn at a higher rpm for a given tip speed, thus simplifying gear reduction in the drive train. Additionally, by eliminating the exposed blades of the rotors, ducts 101/103 substantially increase the safety of the platform while decreasing the noise generated by the platform. The rotors are counter-rotating in order to offset yaw effects. Preferably fixed-pitch rotors are used. Thrust is controlled by varying the rotor rotational speed, i.e., throttling the engine. In the preferred embodiment, rotors 201/203 are each 5 feet in diameter and the vehicle is approximately 12 feet in total length.

Although ducts 101/103, and thus rotors 201/203, can be mounted in a horizontal plane, preferably the assemblies are canted in-line on the longitudinal axis as shown in FIG. 3. The preferred cant between the ducts is approximately 10 degrees, although larger cant angles can be used. Preferably the cant angle is less than 45 degrees. Canting the rotor/duct assemblies enhances the platform's hovering stability while reducing momentum drag and nose down pitch angle in forward flight.

Preferably rotors 201/203 are coupled to a single drive unit 105 (i.e., motor and transmission) and rotate at the same rate. Drive unit 105 is coupled to rotors 201/203 via a pair of drive shafts, one of which (i.e., drive shaft 107) is visible in FIG. 1, and a pair of gear boxes 109/111. Covering drive unit 105 is an engine cowling 113 which includes a sitting area 115 for the pilot. Although not shown, preferably seat 115 is padded, for example like a motorcycle seat, to provide additional pilot comfort. Cowling 113 is shaped to conform to the stance of a seated pilot.

In addition to cowling 113, foot support plates 117 are used by the pilot to exert force on the platform. Preferably foot support plates 117 are wide enough to allow the pilot to vary his stance during flight, thus allowing the amount of force to be easily and quickly varied by altering on which portions of the support plates pressure is applied by the pilot. The foot support plates 117 are symmetrically spaced about the vehicle centerline, and are preferably positioned above and parallel to the vehicle's plane of lift, thus fostering intuitive control. If desired, each support plate 117 can be equipped with a foot harness, similar to a heel and toe clip used on a ski or snowboard, thus allowing the pilot to exert force on the craft both by pushing down and pulling up with his feet. Although it will be appreciated that cowling 113 and fore and aft support trusses 119 and 121, respectively, can utilize a variety of shapes, preferably they are fabricated from high strength, light weight composites in order to minimize vehicle weight. Mounted to platform 100 are skids 123. Skids 123 are preferably fabricated from tubular aluminum and/or steel components, although composites can also be used in order to minimize weight.

The tandem rotor configuration utilized by the invention introduces a relatively large moment of inertia about the pitch axis. Accordingly, in order to provide the desired kinesthetic control over the vehicle, the control system must be augmented in such a way that pilot intuition is retained. The inventor has found that the best means of augmenting the desired kinesthetic control is through the use of a pair of control handle bars 125 and a pair of control roll bars 127 that are linked to means of aerodynamically altering the flow of air from ducts 101/103. Note that control roll bars 127, also referred to herein as simply roll bars, project through the left and right sides of cowling 113, thus allowing the pilot to control them by applying force via thigh and knee pressure, much like a horseback or motorcycle rider might do in a similar maneuver. As described in detail below, operation of control handle bars 125 and roll bars 127 alters air flow through ducts 101/103 by actuating one or more ejectors located around the periphery of the ducts and/or varying the angle of the fore and aft longitudinal control surfaces 129 and 131, respectively.

As previously noted, control handle bars 125 and roll bars 127 are linked to a means of aerodynamically altering the flow of air from ducts 101/103, preferably via peripherally mounted control ejectors and longitudinal control surfaces. In the preferred embodiment mechanical linkage is used, for example push-pull cables, although other means can be used such as a pneumatic system utilizing pneumatic actuators.

Peripheral Control Ejectors

In one aspect of the control methodology described herein, the tip portion of the propeller downwash at the plane of the propeller is captured and augmented for thrust and control. The captured flow can be redirected, on command, peripherally about the duct to provide pitch and roll moments as well as thrust throttling. As such, the system approaches the capabilities of an articulated rotor, while retaining the benefits of a ducted fan. The means for achieving these benefits is via peripheral ejectors affixed to the trailing edge of the duct with actuators in the mixing section.

The peripheral ejector system of the present invention provides several benefits. First, due to the added augmentation of the ejector, it increases the control forces over that which would be realizable by simply reversing the flow. Second, when air is allowed to pass through the duct without diversion, i.e., with no control input, the ejector is shaped to straighten and entrain ambient air outboard of the duct into the flow-field, increasing thrust and offsetting the weight and drag of the system. Third, as forces generate the greatest moments the further they act from the axis of rotation, the peripheral location of the ejector creates the maximum moment from the force available from the propeller flow. Fourth, as the mechanisms required to divert the flow are small in mass and inertia and are affixed to stationary components rather than the rotating propeller, they are ideal candidates for electromechanical actuation.

Figure 4:
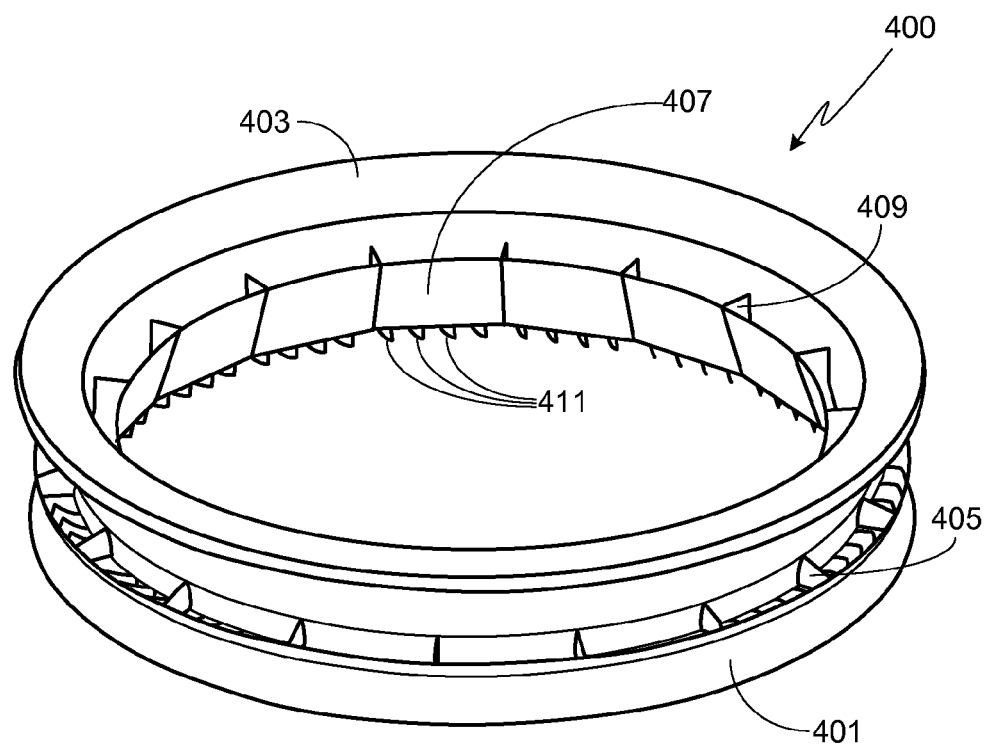
FIG. 4 provides a perspective view of one of the fan ducts used in the lift platform shown in FIGS. 1-3.
Figure 5:
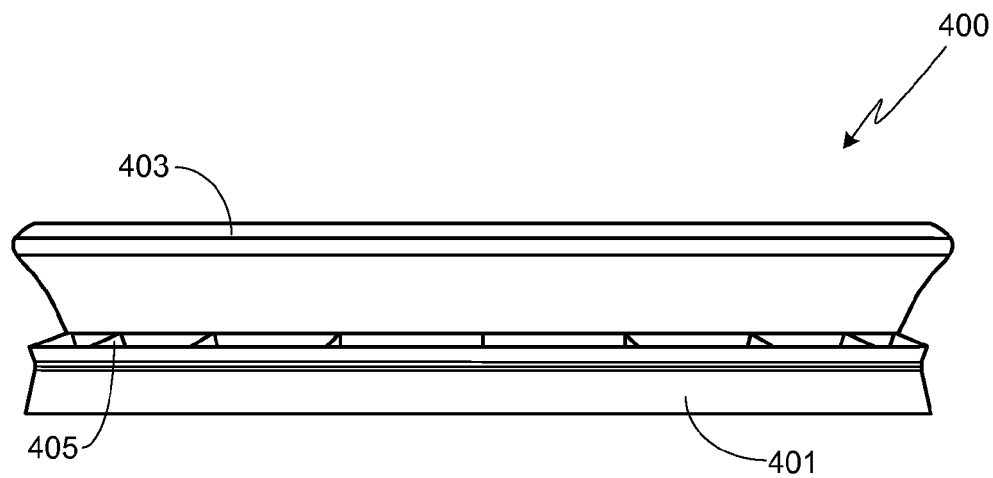
FIG. 5 provides a side view of the fan duct shown in FIG. 4.

FIGS. 4 and 5 provide perspective and side views, respectively, of a preferred duct control system for use with ducts 101 and 103. Only a single duct is shown, thus simplifying the figures, although it should be appreciated that the same approach is preferably used with both ducts. Similarly, the propeller is not shown in FIGS. 4 and 5, and in some of the subsequent figures, thus further simplifying the figures for the sake of clarity.

In accordance with the invention, ducted fan system 400 includes an outer cowl 401 that is affixed to the trailing edge of the outer periphery of duct 403, for example using multiple mounting stand-offs 405. Similarly, an inner cowl 407 is affixed to the trailing edge of the inner periphery of duct 403 using multiple mounting stand-offs 409. As described and illustrated in detail below, a single stand-off may be used that provides means for attaching both outer cowl 401 and inner cowl 407 to duct 403, thereby replacing individual stand-offs 405 and 409. Actuators 411, critical to the use of the ejectors as a control system, are not visible in FIG. 5 and are only partially visible in FIG. 4.

As shown, outer cowl member 401 and inner cowl member 407 are divided into a plurality of discrete control sections, the individual control sections defined by the cowling mounting stand-offs, i.e., stand-offs 405 and 409. Accordingly, it is preferred that mounting stand-offs 405 and 409 be aligned, as shown, and more preferably, comprised of a single sheet of material. To a degree, the number of control sections determines the level of fine control that may be exerted by the control system. Given the trade-off between system complexity and control sensitivity, and given the level of control required by most applications, in at least one preferred embodiment the circumference of the fan is divided into eighteen, 20-degree control sections.

Figure 6:
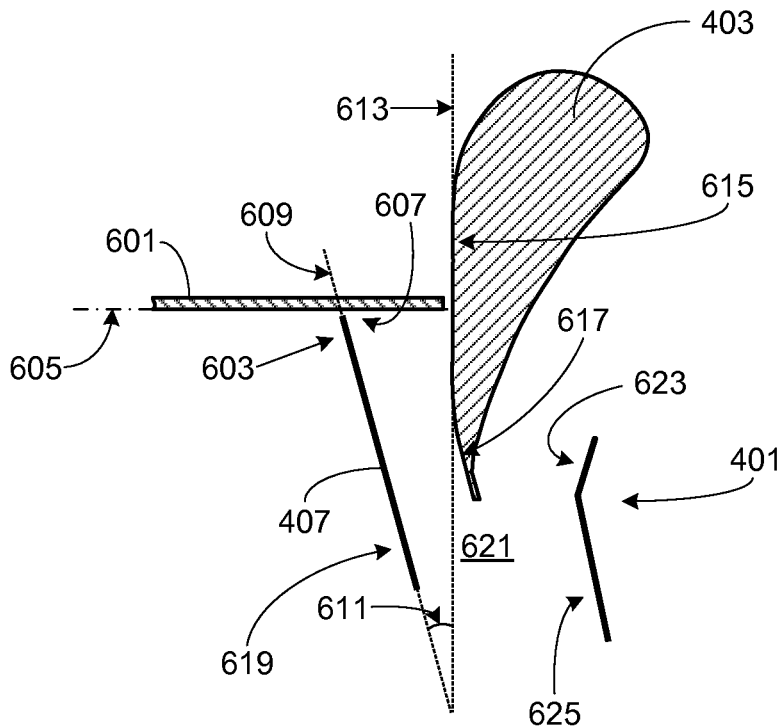
FIG. 6 provides a cross-sectional view of a control section, this view not showing the cowling stand-offs.
Figure 7:
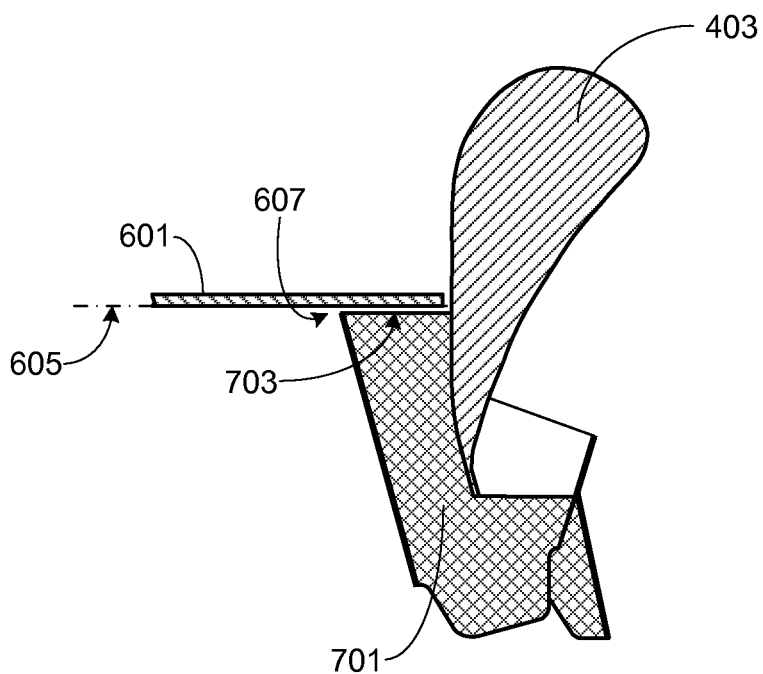
FIG. 7 provides the same cross-sectional view of the control section as that shown in FIG. 6, with the inclusion of cowling stand-offs.

FIGS. 6 and 7 provide cross-sectional views of a control section. While FIG. 6 only shows the cowling control surfaces associated with this particular control section, FIG. 7 also includes cowling stand-off 701. For reference, these figures include propeller tip 601. As noted above, inner cowl 407 is a peripheral element that resides in the propeller downdraft, attached to the duct via mounting stand-off 701 in FIG. 7. The leading edge 603 of inner cowl 407 and the leading edge 703 of stand-off 701 extend nearly up to the plane 605 of propeller 601, leaving only a small clearance 607 between propeller plane 605 and leading edges 603 and 703. Spacing 607 is sufficient to prevent interference between the rotating propeller 601 and inner cowl 407/stand-off 701. Preferably spacing 607 is on the order of 1/10 of the propeller chord as measured at the ejector inlet lip. In a preferred embodiment of the invention, spacing 607 is approximately 0.25 inches.

As inner cowl 407 permanently resides in the propeller downwash, it is important that it be designed to minimize the drag it imparts to the ducted fan. As shown in FIG. 6, the plane 609 of inner cowling 407 forms a divergent angle 611 with the plane 613 that corresponds to the central wall portion 615 of duct 403. Preferably angle 611 is approximately 15 degrees, and generally no greater than 18 degrees, in order to prevent drag producing separation. Note that in the illustrated embodiment of the invention, and as preferred, the surface of inner cowl 407 is approximately parallel to the duct's trailing edge 617. Although leading edges 603 and 703 must be in close proximity to the propeller plane as noted above, the total height of cowling 407 should be kept as small as possible to minimize parasitic drag. The trailing edge 619 of inner cowling 407 extends below the trailing edge 617 of duct 403 to form the mixing region 621.

Preferably inner cowling 407 is configured to capture between 10% and 20% of the airflow created by propeller 601, and more preferably approximately 20% of the airflow created by propeller 601. Accordingly, assuming a uniform airflow from the propeller and across the duct, the separation distance between the inlet of the inner cowling 407 and the inner duct surface 615 is between 5% and 10% of the propeller radius, and more preferably on the order of 10% of the propeller radius.

Outer cowling 401 is a peripheral element located outboard of duct 403. Preferably, the same mounting stand-off 701 is used with both inner cowl 407 and outer cowl 401, as shown in FIG. 7. As the outer cowling 401 does not need to extend up to the plane 605 of propeller 601, it may be shorter than inner cowling 407 as shown. The outer cowl 401 is convergent-divergent in cross-section. Leading edge 623 of cowling 401 is approximately parallel to the adjacent exterior surface of duct 403, while the trailing edge 625 of cowling 401 is approximately parallel to the trailing edge 619 of inner cowl 407. The outer cowling 401 serves two purposes. First, it redirects the airflow that is diverted by the actuator, as described in detail below. Second, it forms the outboard wall of the ejector as it is shaped to entrain ambient air when the flow through the device is not diverted by the actuator.

Cowling stand-offs 701, or individual cowling stand-offs 405 and 409, are located radially along the duct trailing edge and act as structural supports for the ejectors, i.e., for inner cowl 407 and outer cowl 401. The stand-offs straighten the airflow entering the ejector while providing an end plate for each ejector cavity, thereby essentially isolating each ejector cavity from the adjacent ejector cavity.

Figure 8:
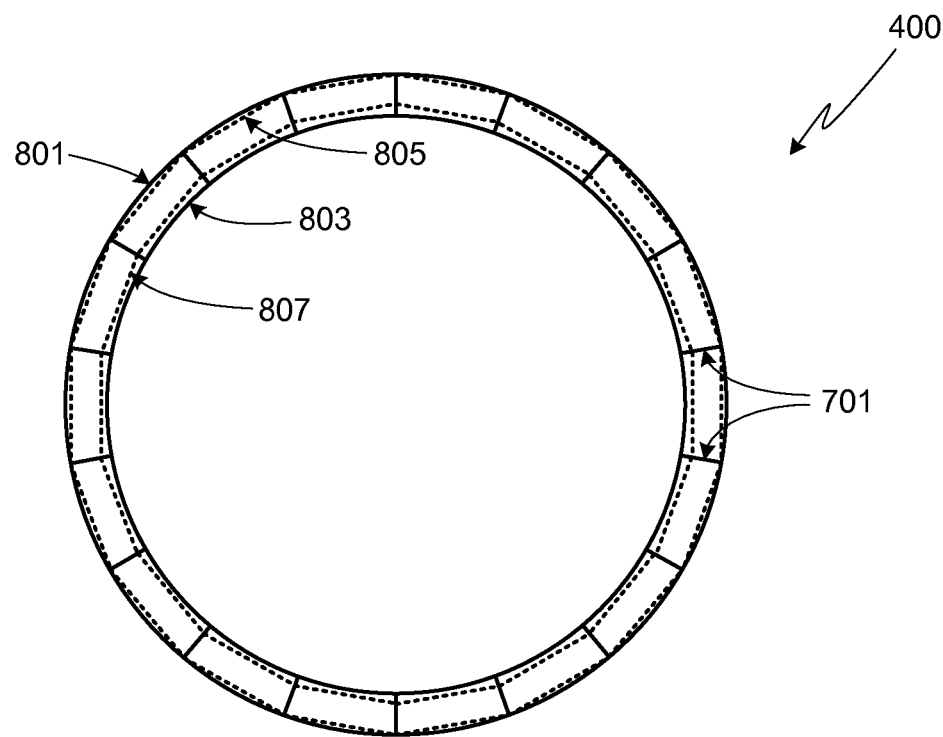
FIG. 8 provides a top view of the ejectors.

Together, inner cowling 407 and outer cowling 401 form a convergent cone in cross-section about the entire periphery of the trailing edge 617 of duct 403, the top of the convergent cone being open on either side of duct 403 as shown. The distance of each cowling member from the duct is preferably constant so that the airflow path is unobstructed and does not generate backpressure. The inner and outer cowls are preferably shaped such that when combined together with the mounting stand-offs the exit region of each ejector cavity is rectangularly-shaped, this exit region occurring at the convergent throat of the cavity. This aspect of the invention is illustrated in FIG. 8, this figure providing a top view of the ejector. Note that this figure does not include the duct, propeller or actuators. As shown, the leading edge 801 of outer cowl 401 and the leading edge 803 of inner cowl 407 are curvilinear and substantially parallel to the outer and inner surfaces, respectively, of the duct. In contrast, the trailing edge 805 of outer cowl 401 and the trailing edge 807 of inner cowl 407 are linear and, together with the mounting stand-offs 701, form a rectangular ejector throat. Note that trailing edges 805 and 807 are shown as dashed lines in FIG. 8 for clarity and so that they are easily distinguishable from the leading edges of the cowlings. The transition to a rectangular throat simplifies actuator design and augments mixing of the entrained ambient air, thereby increasing ejector thrust. The significance of the rectangular cross-section of the ejector throat becomes apparent when the actuators are activated, also referred to herein as deployed, since in this position the edges of the actuators lay tangent to the squared walls to form the close-out that redirects flow.

Figure 9:
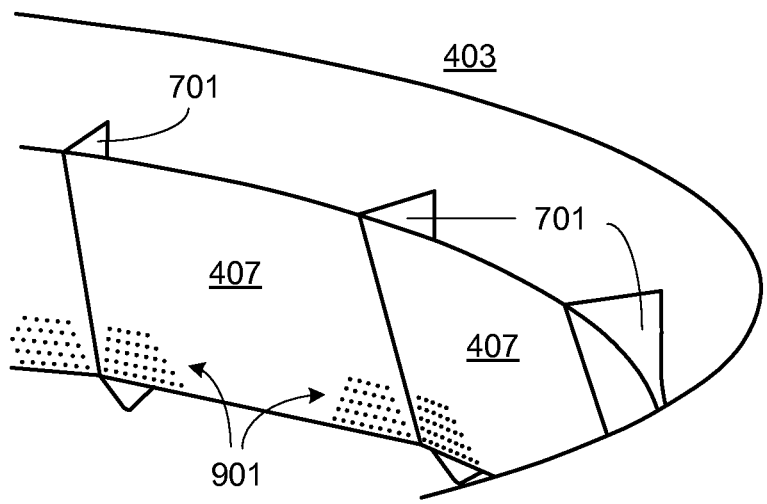
FIG. 9 provides a perspective view of a portion of the embodiment shown in FIG. 4, this figure illustrating the holes within the inner cowling that may be used to reattach separated airflow.

The divergent-convergent section formed by the cowlings increases the capture angle of inner cowling 407, while avoiding separation. As the convergent section of the cowlings increases the velocity of the flow within it, there is a corresponding pressure drop within this section. In at least one preferred embodiment, inner cowling 407 includes a plurality of small holes 901 at the inner section as illustrated in FIG. 9. Preferably holes 901 are approximately 0.040 inches in diameter, spaced approximately 0.3 inches apart, and located in the corners where the capture angle is greatest and therefore the most likely area of flow separation. Due to the pressure differential, holes 901 create a suction of the internal duct flow, thereby acting to reattach any separated flow and allowing a greater angle than detachment would normally permit. This method increases the capture area of the ejector while allowing the actuators to retain their small size.

The peripheral control ejectors of the present invention are not limited to a specific actuator configuration. A first exemplary configuration is shown in FIGS. 10-13 and a second exemplary configuration is shown in FIGS. 14-17, both configurations based on the cross-sectional view provided in FIG. 6 (with the addition of the actuator).

Figure 10:
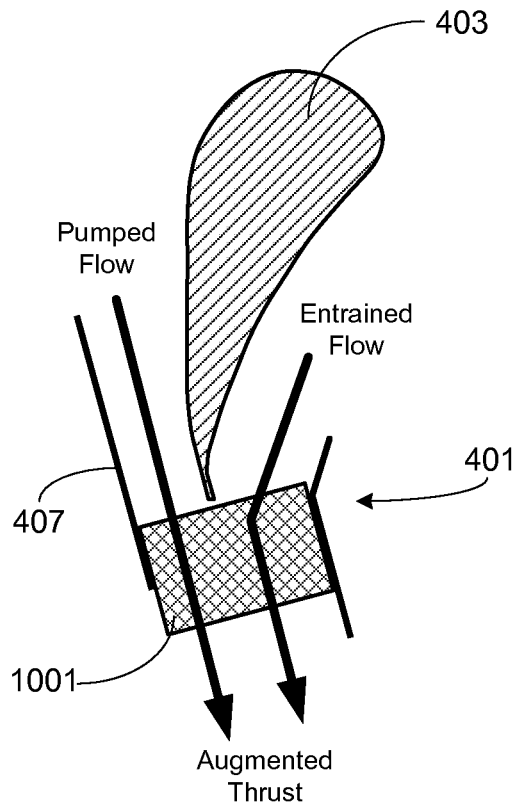
FIG. 10 provides the cross-sectional view of the control section shown in FIG. 6 with the addition of a curved actuator in the open position.
Figure 11:
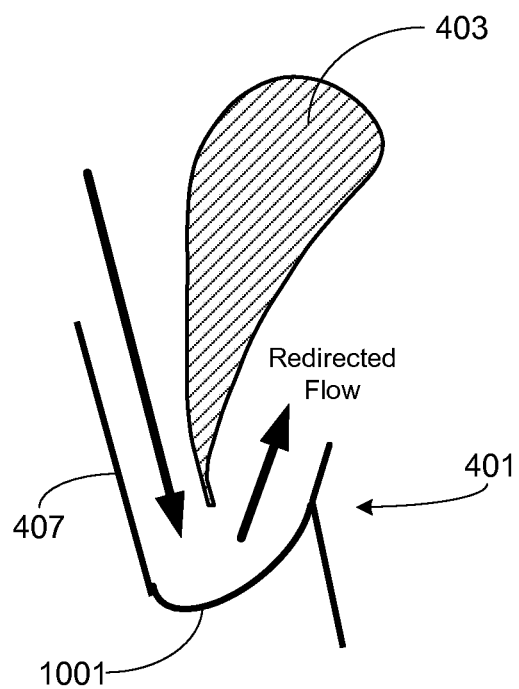
FIG. 11 provides the cross-sectional view of the control section shown in FIG. 6 with the addition of a curved actuator in the closed position.
Figure 12:
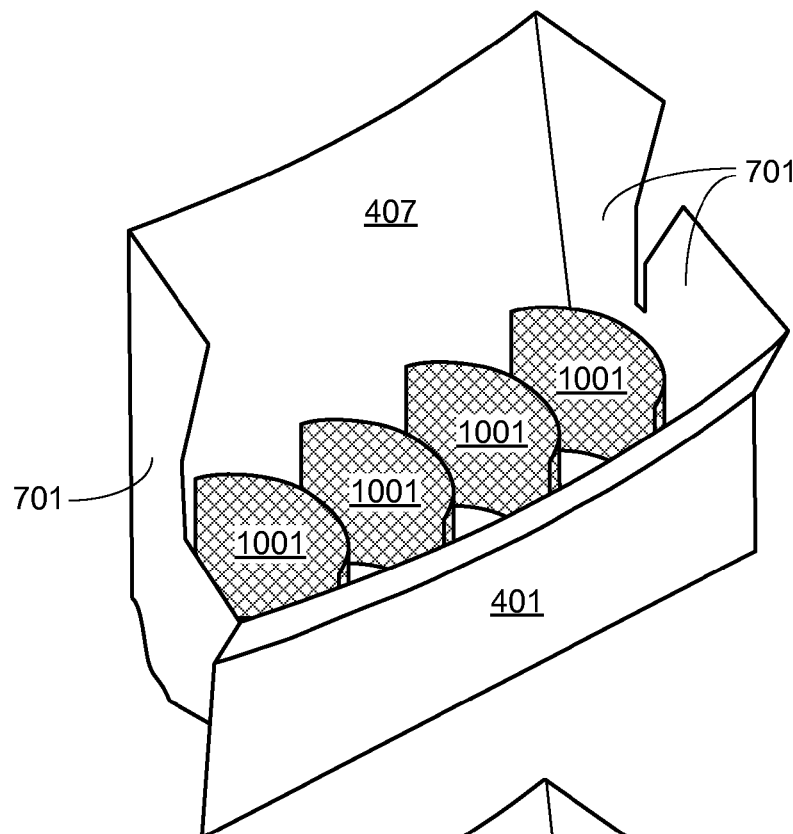
FIG. 12 provides a perspective view of an ejector control section with four curved actuators, all in the open position.
Figure 13:
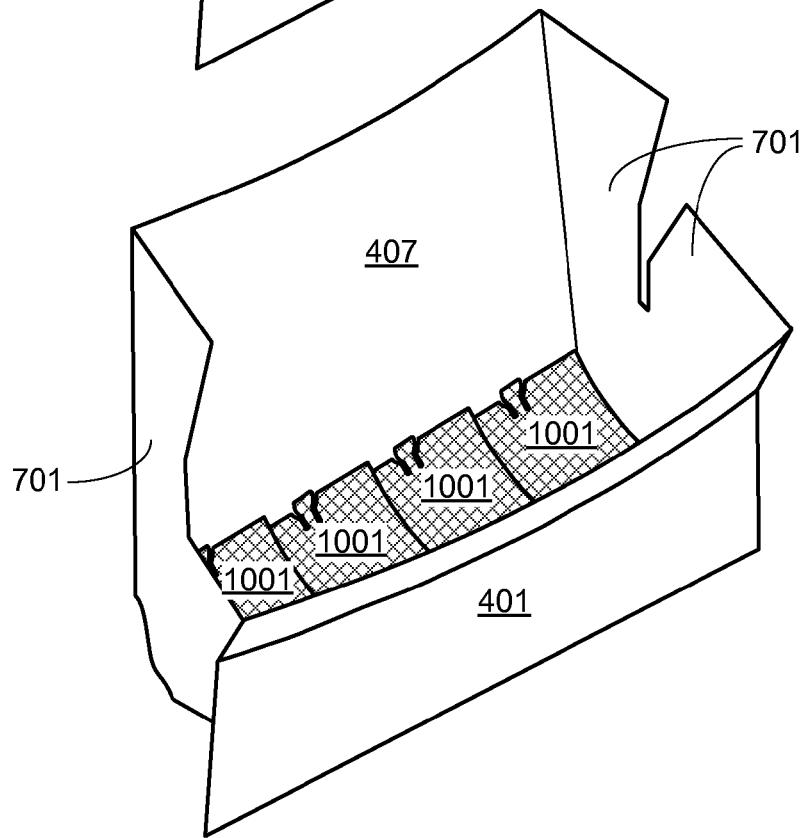
FIG. 13 provides a perspective view of an ejector control section with four curved actuators, all in the closed position.

The actuator configuration illustrated in FIGS. 10-13 uses curved actuators 1001 located within the mixing region, preferably with four actuators 1001 per ejector control section. FIGS. 10 and 12 show the actuators in the 'open' position, which allows air to flow freely between them. FIGS. 11 and 13 show the actuators in the 'closed' position, thus causing the air to be redirected. Note that duct 403 is not shown in FIGS. 12 and 13 in order to present a clearer view of the actuators.

When the actuators are in the open position as shown in FIGS. 10 and 12, also referred to herein as the un-deployed position, the cylindrical axis of each actuator is parallel to the downward vector of the primary airflow stream. As such, each actuator presents a minimal profile, and therefore minimal drag. The curvilinear shape of each actuator directs primary airflow outboard and generates vortices that enhance mixing with the entrained flow, resulting in greater thrust augmentation. The effect also entrains fan flow to straighten and direct it outboard due to the exposure of the inner portion of each actuator to the fan flow.

When closed, also referred to herein as being deployed, each actuator is rotated approximately 90 degrees as shown in FIGS. 11 and 13. As a result of this shift in position, the long axial edges of each actuator are caused to essentially rest against the rectangular sides of the cowling opening, thus obstructing the convergent section airflow and redirecting it toward the outboard cowling (see FIG. 11). As the change in flow path by each actuator is constant in area and downwind of the convergence formed between the inner cowling 407 and duct 403, the propeller experiences no backpressure or adverse feedback from the operation of the actuator.

Figure 14:
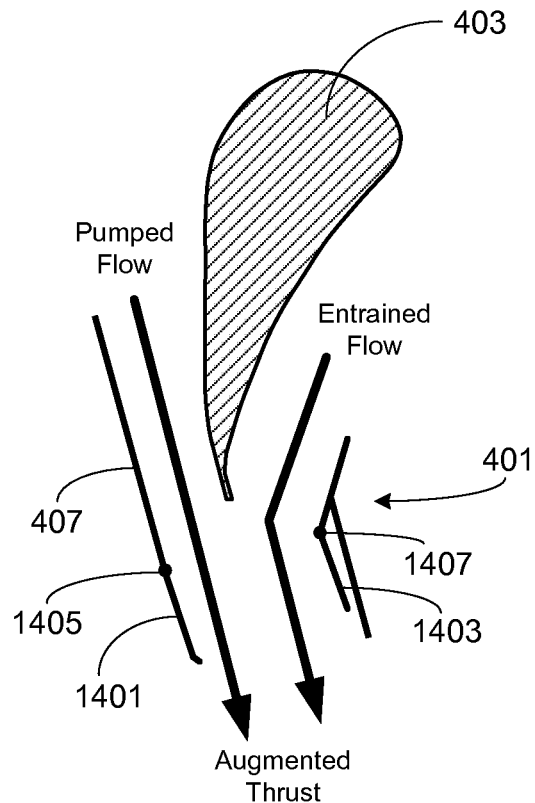
FIG. 14 provides the cross-sectional view of a control section utilizing hinged actuators.
Figure 15:
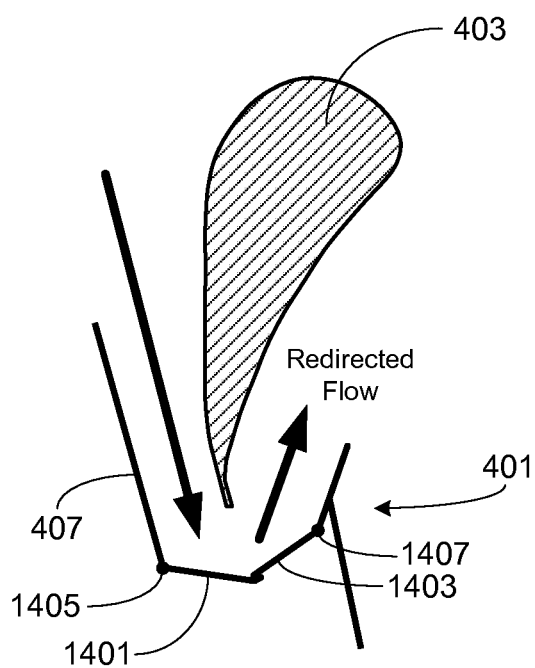
FIG. 15 provides the cross-sectional view of the control section shown in FIG. 14 with the hinged actuators in the closed position.
Figure 16:
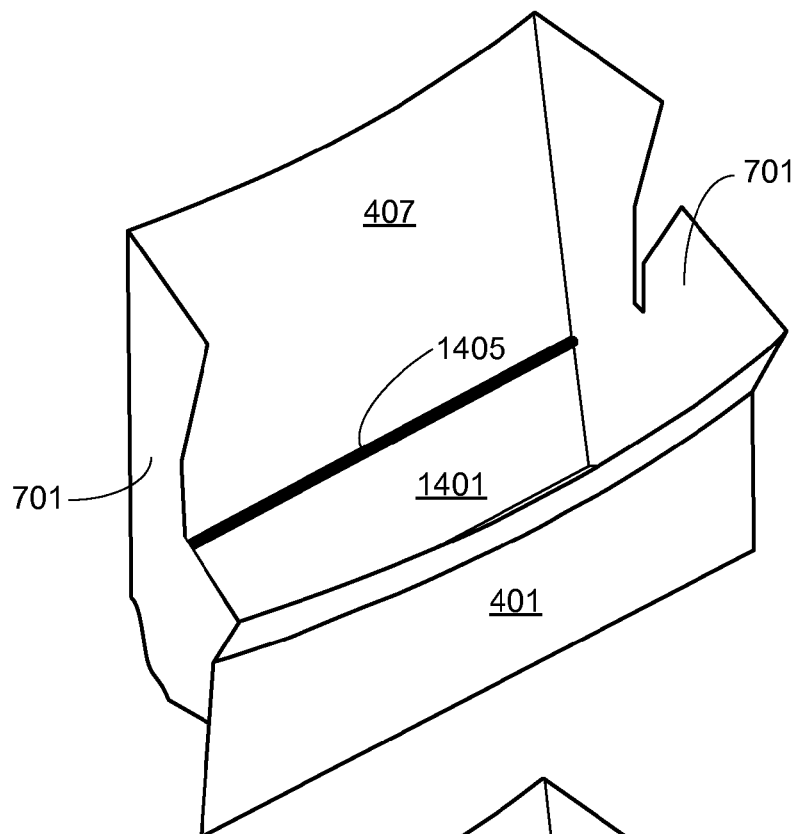
FIG. 16 provides a perspective view of an ejector control section with the hinged actuators of FIGS. 14 and 15 in the open position.
Figure 17:
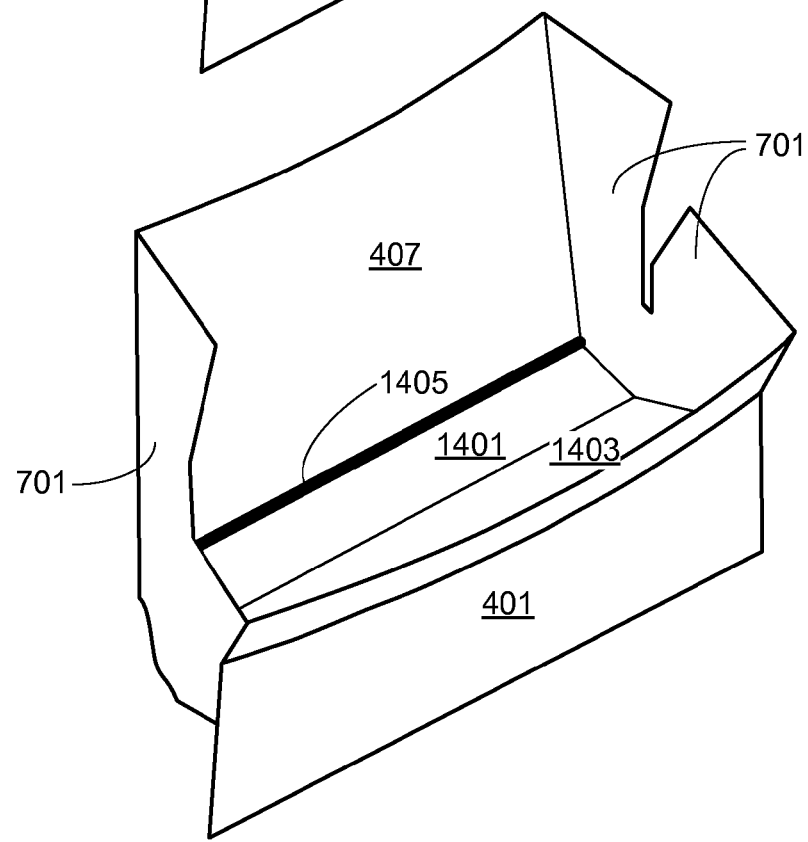
FIG. 17 provides a view of an ejector control section with the hinged actuators of FIGS. 14 and 15 in the closed position.

FIG. 14-17 illustrate a second preferred actuator configuration. In this configuration, corresponding to each ejector section is a pair of actuator surfaces 1401 and 1403. Actuator surface 1401 is attached to inner cowling 407 via hinge 1405 while actuator surface 1403 is attached to outer cowling 401 via hinge 1407. When deployed as shown in FIGS. 15 and 17, actuator surfaces 1401 and 1403 cover the bottom opening of the cone, redirecting flow out the top of the outer cowling, outboard of the duct. In the stowed or open position as shown in FIGS. 14 and 16, the actuator surfaces are tangential to the trailing edge of the duct at approximately the center of the cone formed by the cowlings. As such, in the stowed position the actuator presents a small streamline profile to the flow, thereby minimizing drag. Such actuator placement insures that it is out of the primary flow when not in use, and it is angled such that it is parallel to the flow, which is essentially the same as the divergence angle.

The inventor has found that the hinged actuator configuration shown in FIGS. 14-17 provides less obstruction than that imposed by the curved actuators of FIGS. 10-13 while achieving less leakage when closed. Additionally, the hinged design extends the mixing region when open.

Regardless of whether the previously described curved or hinged actuators are used, due to their small size they may be rapidly switched from one position (e.g., open) to the alternate position (e.g., closed). Assuming the use of control cables, the limited movement required to change actuator positions simplifies control system design as very little control cable travel is required to effect actuator movement. Preferably the control system is designed to neutralize the aerodynamic loads acting upon the actuators so that the actuators favor neither the open nor closed position, thereby minimizing control system loading. The result of such a configuration is a system that is amenable to both servo-control and traditional control cables.

During operation, each propeller blade passes over each ejector inlet formed by inboard cowling 407, duct 403 and stand-offs 701. This primary airflow is directed outboard by the inboard cowling 407 and through the convergent section 621 of the ejector. At the trailing edge of the duct, the cavity formed by the outboard cowling 401 and the outboard surface of duct 403 comes into communication with the primary flow at the convergent section 621. As a result, the secondary outboard flow is entrained into the primary flow, leading to thrust augmentation (see, for example, FIGS. 6 and 10).

The mechanism for entrainment and therefore thrust augmentation is through shear mixing of the primary flow with the outboard flow. Augmentation can be increased by enhancing the mixing, for example by optimizing the actuators that reside within the mixing area. Additionally, augmentation may be increased by adjusting the pumping frequency of the primary flow.

As opposed to a true jet stream, the primary flow through each peripheral ejector of the present invention is not of constant velocity since the airflow is driven by the blades of a propeller or fan. As a result of using a propeller/fan, the airflow through each ejector control section occurs as a blade of the propeller/fan passes over and "pumps" the flow through that particular ejector control section. The frequency of the pumping is therefore a function of the propeller's RPM and the number of propeller/fan blades. Through the proper selection of ejector geometry, propeller blade pitch, blade quantity and operating RPM, the pumping frequency can be optimized. As an example, in a preferred embodiment, the blade pitch is tuned to provide the required thrust at a propeller speed of 2,000 rpm, such that with the selection of a five-blade propeller, the pumping frequency in each ejector control section is 172 Hz.

In accordance with the invention, control is accomplished by activating the actuators within an individual ejector control section, or within multiple ejector control sections, for example by activating sequential control sections. By switching the position of a set of actuators within a control section from the open position to the closed position, the captured thrust is redirected at that location, thereby canceling thrust augmentation. This, in turn, causes the ducted fan to tilt toward that control section. If the actuators within several adjacent control sections are closed simultaneously, the tilting force is greater, and the rate of tilt increases.

When all actuators are closed in unison, the thrust captured by the inner cowling is diverted, providing a mechanism to vary the thrust of the ducted fan without varying the throttle of the engine. This approach to controlling thrust is significant for several reasons. First, it allows engine run-up to flight speed, while reducing its thrust to prohibit taking flight, effectively acting as a parking brake. In prior art systems, this was only feasible with an articulated rotor, not a fixed pitch system. Second, the ability to vary the thrust of the ducted fan while running the motor at constant speed permits the use of engines that possess low torque or operate most efficiently at constant speed, such as gas turbine engines. Previously this type of power plant has not been an option in a fixed-pitch system, as its response under load is too sluggish.

The force generated by the deployment, i.e., activation, of the actuators is non-linear, with the full effective force of an ejector control section not being generated until the actuators within the section are nearly fully deployed. As a result, fine force control with a single actuator is inherently difficult. This would be problematic if the span of an ejector control section were large, say on the order of 90 degrees, since an activated control section would generate enormous and near-instantaneous force that would not be useful for control. To resolve this issue, the present invention utilizes multiple, small ejector control sections to regulate the control force and rate of application. For example, in the preferred embodiment, and as noted above, eighteen 20-degree ejector control sections are used.

The moment generated for a particular ejector control section is a function of the distance of the ejector control section from the axis of rotation, and therefore varies with each section's position, even though the force they generate is the same. Table I illustrates this aspect of the invention within a single duct utilizing a 60 inch ducted fan with a force of 4.8 lbs.

TABLE I

| Ejector ID | Position (degrees) | Lever Arm Lateral | Long. (ft lbs) | Moment Roll (ft lbs) | Pitch (ft lbs) |
|---|---|---|---|---|---|
| 1 | 0-20 | 0.0 | 31.0 | 0.0 | 12.3 |
| 2 | 20-40 | 10.6 | 29.1 | 4.2 | 11.6 |
| 3 | 40-60 | 19.9 | 23.7 | 7.9 | 9.5 |
| 4 | 60-80 | 26.8 | 15.5 | 10.7 | 6.2 |
| 5 | 80-100 | 30.5 | 5.4 | 12.2 | 2.1 |
| 6 | 100-120 | 30.5 | -5.4 | 12.2 | -2.1 |
| 7 | 120-140 | 26.8 | -15.5 | 10.7 | -6.2 |
| 8 | 140-160 | 19.9 | -23.7 | 7.9 | -9.5 |
| 9 | 160-180 | 10.6 | -29.1 | 4.2 | -11.6 |
| 10 | 180-200 | 0.0 | -31.0 | 0.0 | -12.3 |
| 11 | 200-220 | -10.6 | -29.1 | -4.2 | -11.6 |
| 12 | 220-240 | -19.9 | -23.7 | -7.9 | -9.5 |
| 13 | 240-260 | -26.8 | -15.5 | -10.7 | -6.2 |
| 14 | 260-280 | -30.5 | -5.4 | -12.2 | -2.1 |
| 15 | 280-300 | -30.5 | 5.4 | -12.2 | 2.1 |
| 16 | 300-320 | -26.8 | 15.5 | -10.7 | 6.2 |
| 17 | 320-340 | -19.9 | 23.7 | -7.9 | 9.5 |
| 18 | 340-360 | -10.6 | 29.1 | -4.2 | 11.6 |

The control offered by the peripheral control ejectors described herein is advantageous for a powered lift vehicle as control is a function of generating moments rather than forces. Therefore by selectively activating specific ejector control sections, fine craft control may be achieved.

The non-linearity of the actuator operation is beneficial in another way, as it allows the use of low-cost and reliable solenoid actuators. These devices operate similarly to a linear actuator, but with the simplicity of only two positions; compressed and fully extended.

It will be appreciated that the above-described peripheral control ejectors may be modified without departing from the basic elements, and thus the benefits, of such a control system. For example, the exact shape of the ejectors, the type of actuator control (e.g., control cable, electro-mechanical servos, etc.), the actuator mechanism, the number of ejector control sections, etc. may all be modified.

Longitudinal Control Surfaces

In addition to the peripheral control ejectors, the control system of the present invention preferably further includes longitudinal control surfaces mounted above each duct, preferably using a pair of such surfaces 129 above duct 101 and a second pair of such surfaces 131 above duct 103. As described in detail below, control handle bars 125 are linked, for example using a mechanical linkage such as pull cables, to the longitudinal control surfaces. In the preferred embodiment, and as shown in FIGS. 1 and 2, the longitudinal control surfaces are mounted equidistant from the vehicle's centerline, extending completely across the corresponding duct.

Kinesthetic Control System

In order to utilize kinesthetic control, vehicle 100 must be designed to meet certain criteria. First, as shown in FIG. 3, the plane of lift (i.e., lift planes 301 and 303) must be below the pilot's center of gravity and the vehicle's center of gravity (i.e., CG 305), and preferably below the plane of the pilot's feet. Second, as the ratio of the pilot's body mass to the mass of the vehicle determines how responsive and controllable the vehicle is to the pilot's control, vehicle inertia and mass must be kept low. Third, preferably the vehicle CG 305 is slightly forward of the center of the vehicle as shown, and at a height approximately a quarter-chord height of longitudinal control surfaces 129 and 131.

Figure 18:
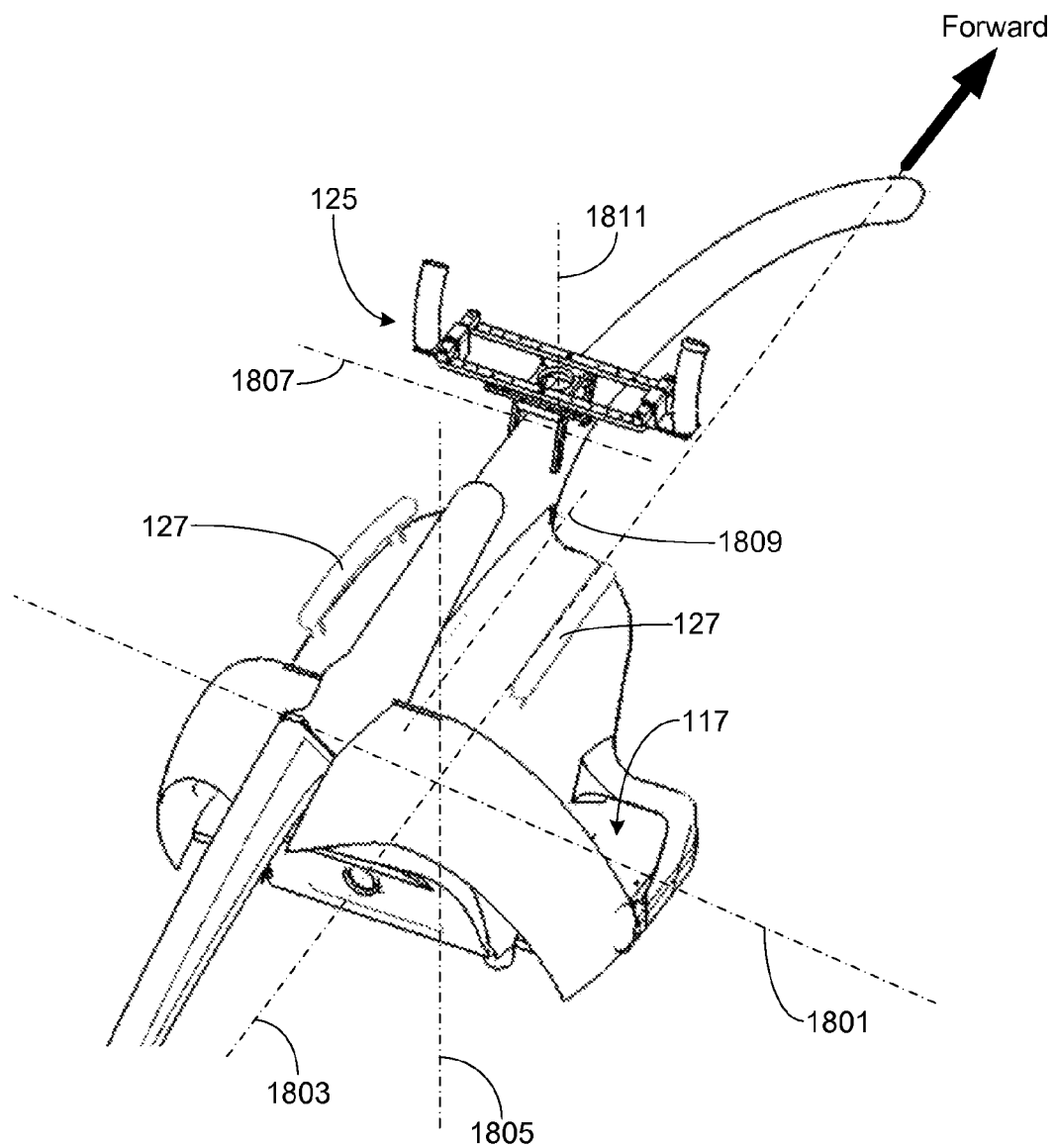
FIG. 18 provides a perspective view of a portion of the lift platform shown in FIGS. 1-3, this view highlighting both the pilot control interface and the various axes of motion.
Figure 19:
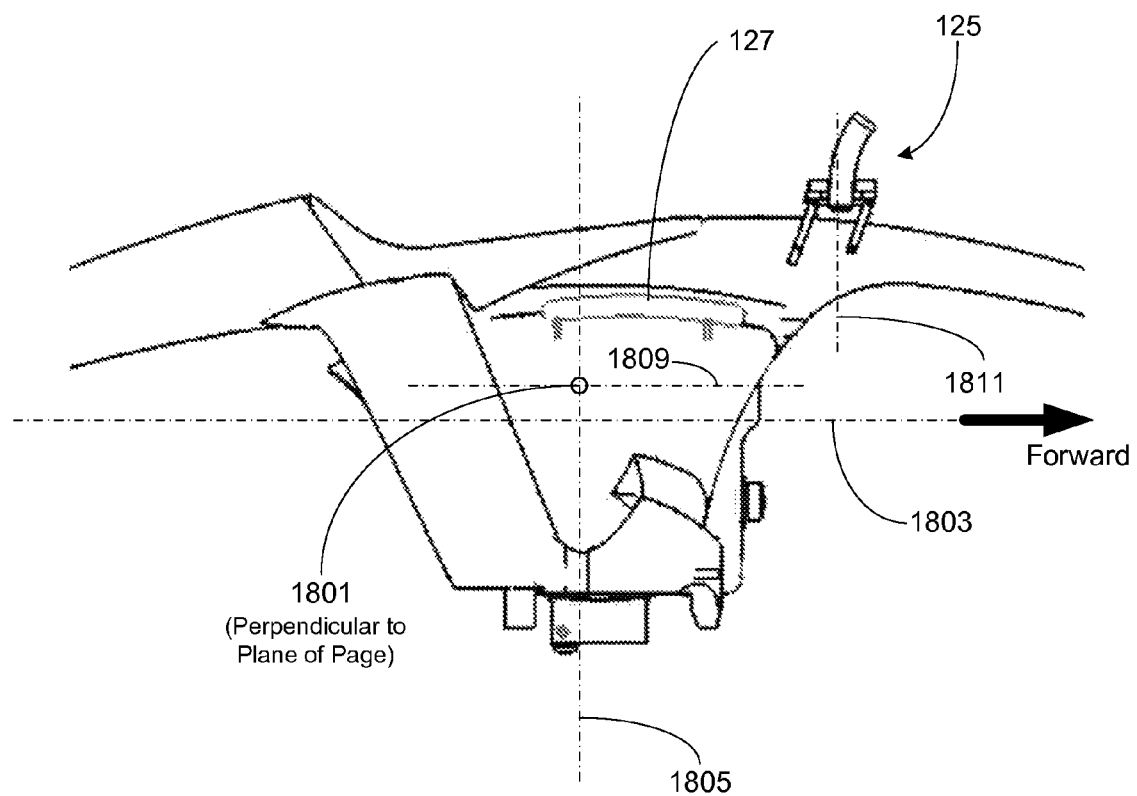
FIG. 19 provides a side view of the portion of the lift platform shown in FIG. 18, this view further highlighting the pilot control interface and the various axes of motion.

FIGS. 18 and 19 provide perspective and side views, respectively, of a portion of lift platform 100, these views highlighting both the pilot control interface and the various axes of motion. Specifically, these views show the vehicle pitch axis 1801, the vehicle roll axis 1803, and the vehicle yaw axis 1805. These views also show the control bar pitch axis 1807, the roll bar pivot axis 1809, and the control bar yaw axis 1811.

Figure 20:
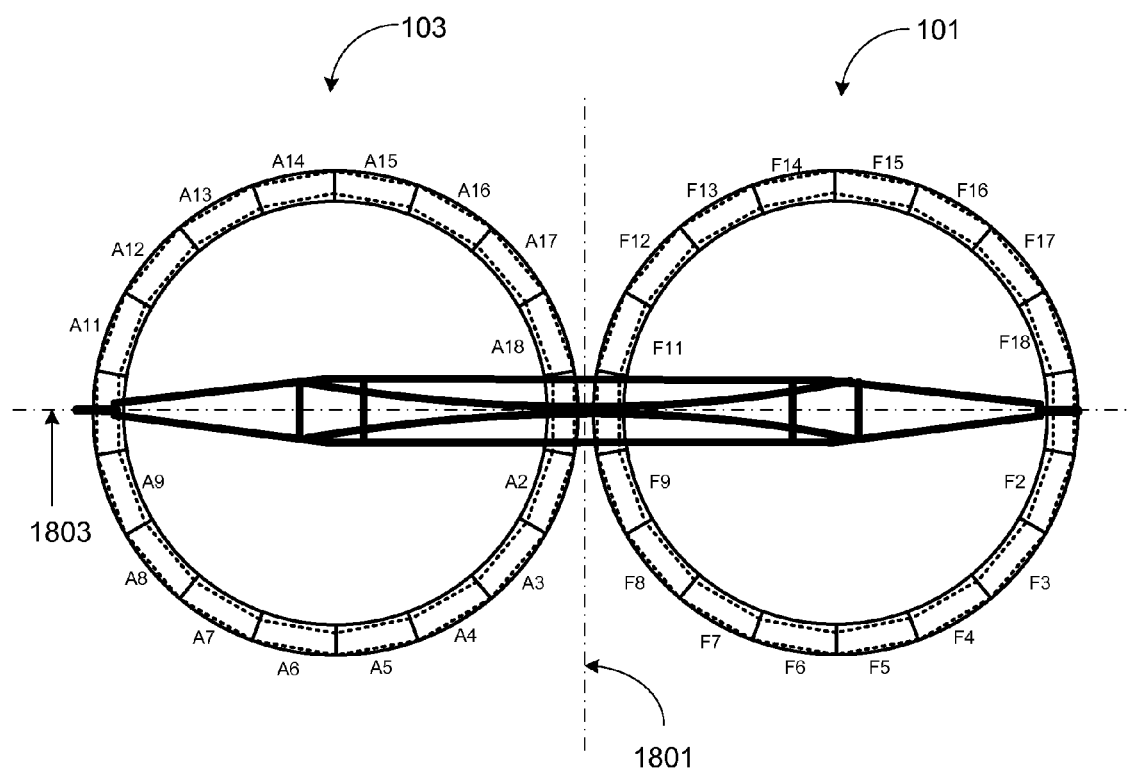
FIG. 20 illustrates the numbering scheme of the peripheral ejector control sections used in the description of the vehicle control systems.

Each aspect of vehicle control will now be described in detail. Note that in the subsequent sections describing vehicle control, the numbering scheme of the peripheral control ejector sections shown in FIG. 20 is used. In this figure and in subsequent descriptions, the "A" prior to a peripheral ejector section number means that the corresponding ejector is associated with the aft duct while an "F" prior to a peripheral ejector section number means that the corresponding ejector is associated with the fore duct. Lastly, and as previously noted, it should be understood that the lift platform of the invention may use a fewer number, or a greater number, of ejectors and that the 18 ejector sections per duct simply represents a preferred embodiment.

Roll

Figure 21:
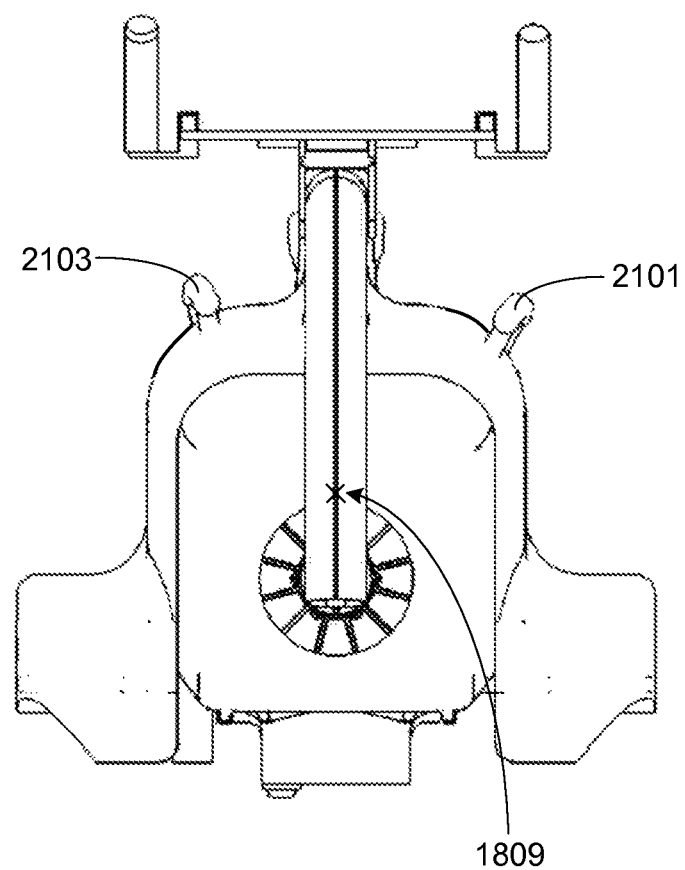
FIG. 21 provides a front view of a portion of the lift platform shown in FIGS. 1-3, this view showing the roll bars in the maximum roll left position.
Figure 22:
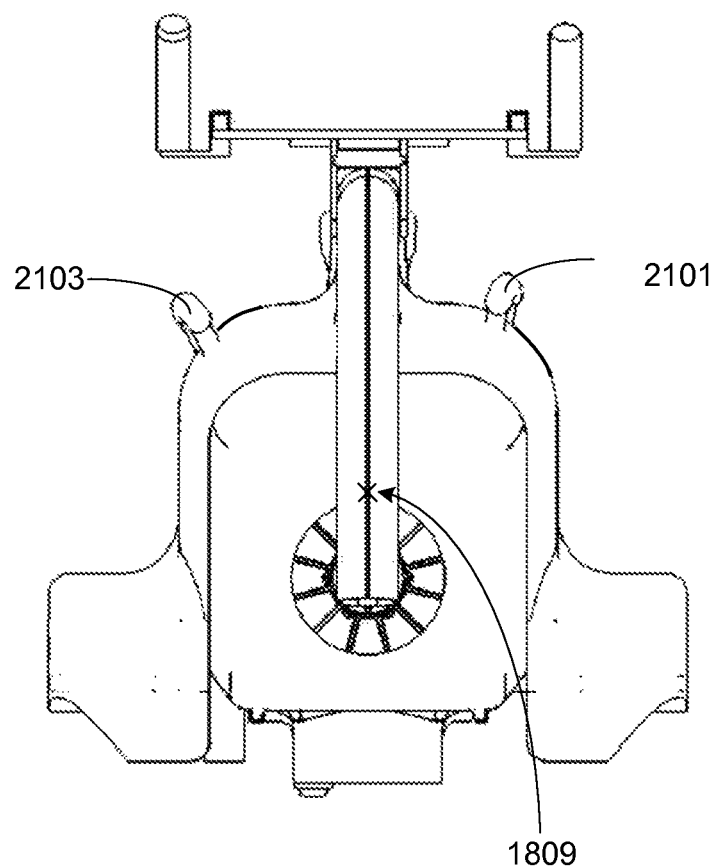
FIG. 22 provides a front view of a portion of the lift platform shown in FIGS. 1-3, this view showing the roll bars in the maximum roll right position.

FIGS. 21 and 22 provide the same frontal view of a portion of lift platform 100, these views highlighting the range of motion of the control roll bars. In the view shown in FIG. 21, left roll bar 2101 and right roll bar 2103 are shown in their maximum roll left positions. In the view shown in FIG. 22, left roll bar 2101 and right roll bar 2103 are shown in their maximum roll right positions. In the preferred embodiment, roll bars 2101/2103 each consist of a tube, approximately 18 inches long, located on the sides of the fairing as shown (see, for example, FIGS. 1-3). Roll bars 2101/2103 run longitudinally and are positioned at approximately the height of the pilot's knees or inner thighs. By making the roll bars relatively long, the bars easily accommodate the change in knee/thigh position as the pilot varies between standing, squatting and riding positions.

Figure 23:
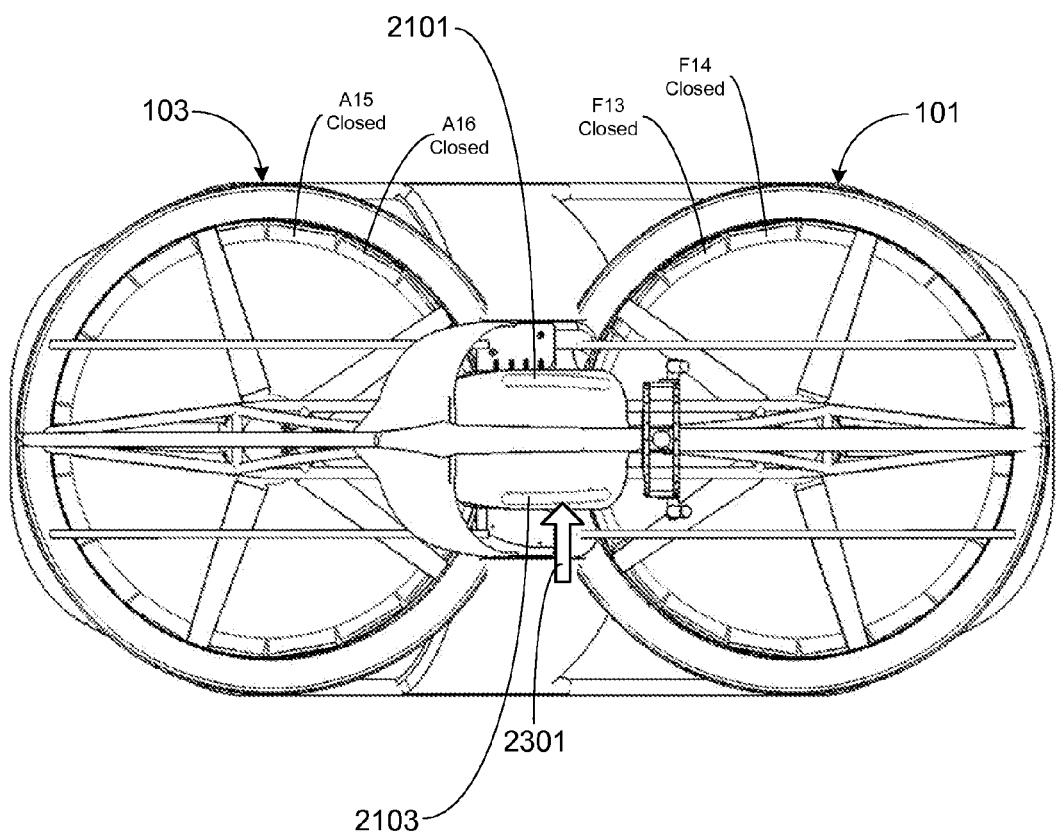
FIG. 23 illustrates the roll left input and response.
Figure 24:
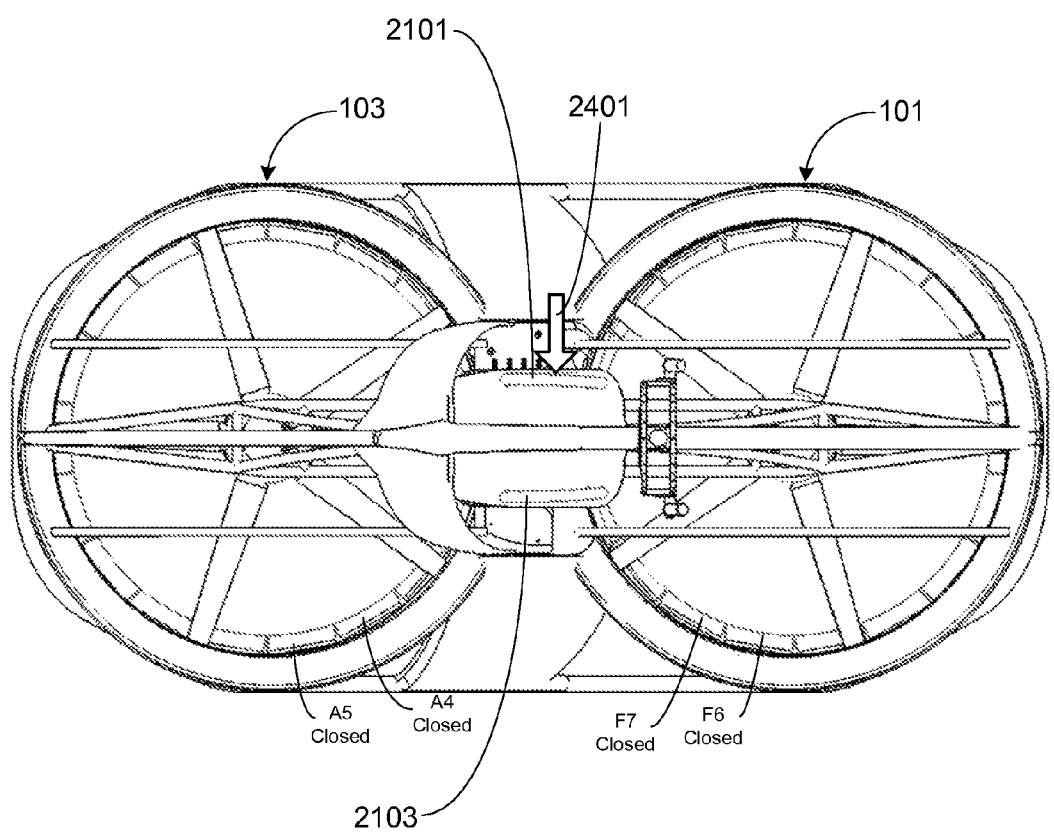
FIG. 24 illustrates the roll right input and response.

Roll bars 2101 and 2103 are rigidly fixed to one another, causing them to move as one. The roll bars pivot about axis 1809, axis 1809 being perpendicular to the plane of the figure in FIGS. 21 and 22. In the preferred embodiment, and as illustrated in FIG. 23, when the pilot moves roll bars 2101/2103 to the pilot's left in a direction 2301, the actuators in ejector sections A15, A16, F13 and F14 are closed, causing lift platform 100 to roll to the left about roll axis 1803. Similarly, and as illustrated in FIG. 24, when the pilot moves roll bars 2101/2103 to the pilot's right, the actuators in ejector sections A4, A5, F6 and F7 are closed, causing lift platform 100 to roll to the right about roll axis 1803. For both roll left and roll right maneuvers, the set of affected actuators are closed in unison. In an alternate embodiment, closing of the affected actuators is staggered, thus providing a more gradual introduction of control force. For example, in such an alternate embodiment (and assuming a roll left maneuver), the A16 and F13 actuators may be closed prior to closing the A15 and F14 actuators. In another alternate embodiment, the number of affected actuators depends on how far to the left, or to the right, that the roll bars are moved. For example, for a small amount of movement to the right, only actuators A5 and F6 are closed while for a larger amount of movement to the right, actuators A4, A5, F6 and F7 are all closed.

Figure 25A:
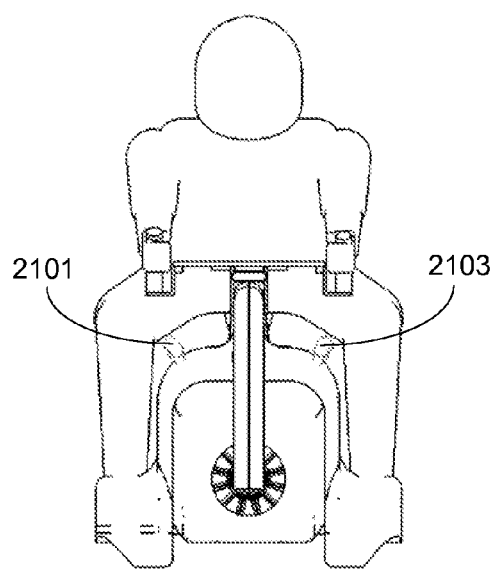
FIG. 25A illustrates the lift platform and pilot in a neutral position.
Figure 25B:
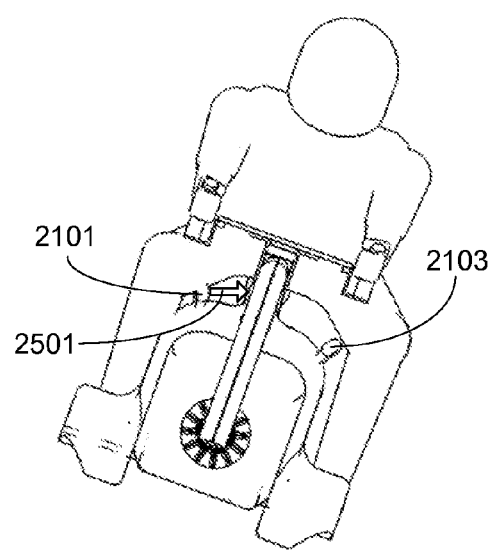
FIG. 25B illustrates the lift platform and pilot commanding a roll left maneuver.

Roll bars 2101 and 2103 are designed to take advantage of the natural tendency of a pilot to lean into a turn. As the pilot leans into the turn, his or her knees press against one side of the vehicle which, in this invention, causes pressure to be applied to one of the control roll bars. This action is illustrated in FIGS. 25A and 25B which show a pilot in a neutral position (FIG. 25A) and then leaning into a left roll maneuver (FIG. 25B). Note that as the pilot leans to their left (which is to the right in the figure), the pilot's outboard inner thigh or knee presses right roll bar 2103 in direction 2501 towards the left and the vehicle's centerline. As a result, left side actuators are closed (e.g., A15, A16, F13 and F14) and the vehicle rolls left.

Figures 26A, 26B, 26C:
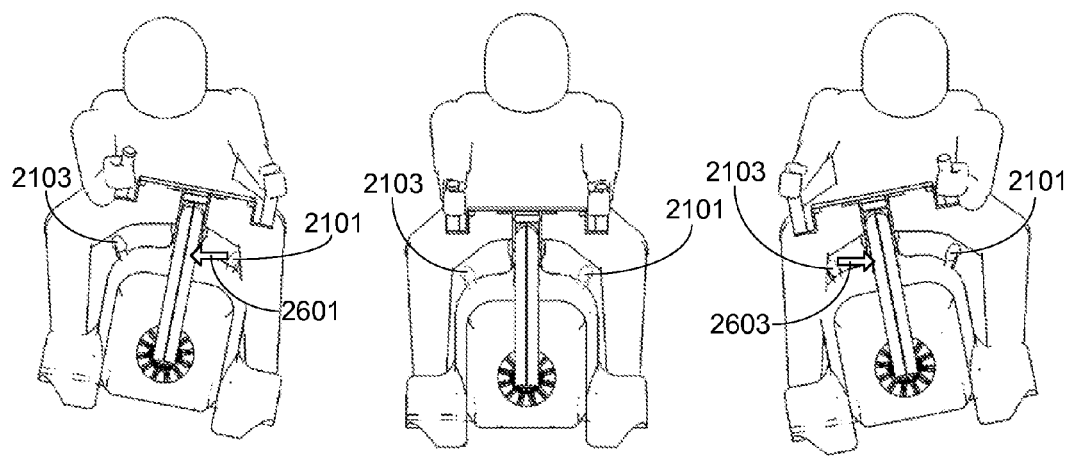
FIG. 26A illustrates platform stabilization when the lift platform begins to roll left.
FIG. 26B illustrates the lift platform and pilot in a neutral position.
FIG. 26C illustrates platform stabilization when the lift platform begins to roll right.

In addition to providing a means for commanding a roll left or roll right maneuver, roll bars 2101 and 2103 provide an inherent stabilizing function, not even requiring the conscious involvement of the pilot. In particular, as the vehicle initiates an undesired roll, the pilot unwittingly attempts to remain vertical. The pilot's movements are then translated by the roll bars into minor roll adjustments, thereby countering the vehicle's undesired roll. This action is illustrated in FIGS. 26A-C. As shown, when the vehicle begins to roll away from the neutral position (shown in FIG. 26B), the pilot's natural movements results in an automatic corrective action taking place. Thus if the vehicle begins to roll left (see FIG. 26A), the pilot's tendency to remain vertical causes the pilot's left inner thigh/knee to press against left roll bar 2101 in a direction 2601, thus commanding the vehicle to roll to the right. Similarly, if the vehicle begins to roll right (see FIG. 26C), the pilot's right inner thigh/knee presses against right roll bar 2103 in a direction 2603, thus commanding the vehicle to roll to the left, thereby correcting the undesired roll of the vehicle.

Pitch

Figure 27:
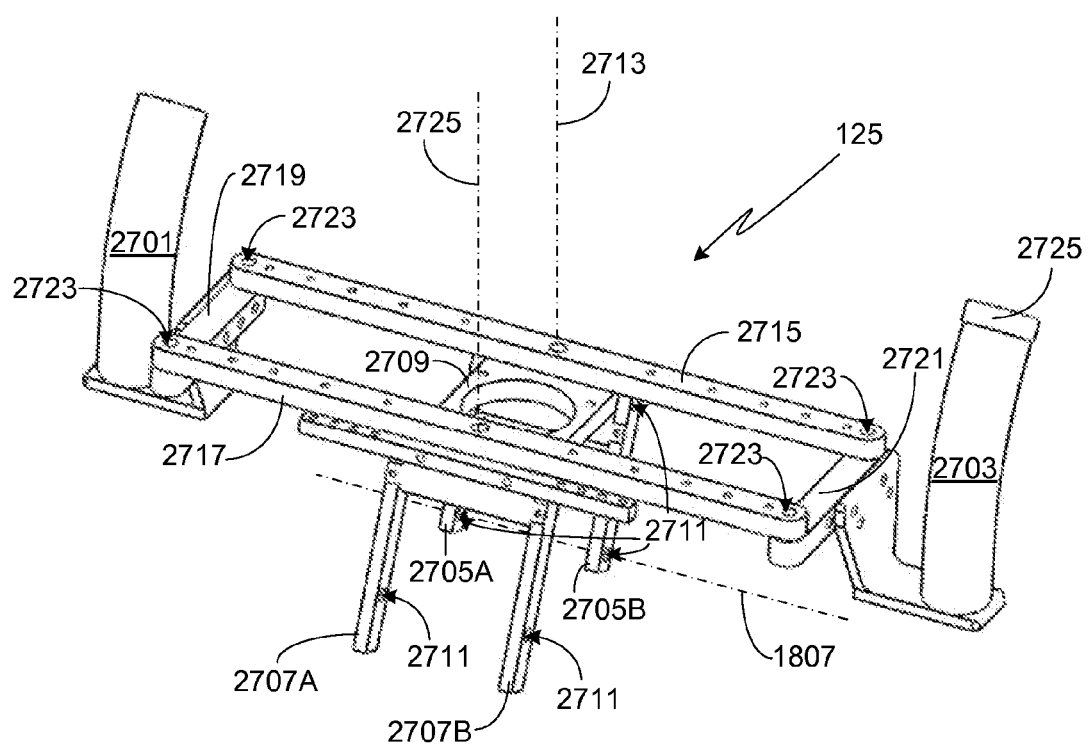
FIG. 27 provides a detailed view of the control handle bars.

Pitch is controlled by pushing forward, or pulling rearward, control handle bars 125. As shown in the detailed view of the handle bars provided in FIG. 27, control handle bar 125 includes a left hand grip 2701 and a right hand grip 2703, spaced approximately 22 inches apart. In the preferred embodiment, the left and right hand grips are vertically oriented although it will be appreciated that other grip orientations (e.g., horizontal, angled, etc.) are possible, for example depending upon user preference.

To accommodate pitch control, preferred and illustrated control handle bar 125 uses a pair of leading arms 2705A/2705B, also referred to herein as the forward pitch linkage, and a pair of trailing arms 2707A/2707B, also referred to herein as the rear pitch linkage. Due to the pivot points 2711 at either end of the leading and trailing arms (only some of which are visible in this figure), this arrangement ensures that the plane of platform 2709 mounted on top of the leading/trailing arms, remains perpendicular to vehicle yaw axis 1811 regardless of the angle of the control bars during pitch commands. Preferably the leading arms rotate ±35 degrees about axis 1807.

Figure 28:
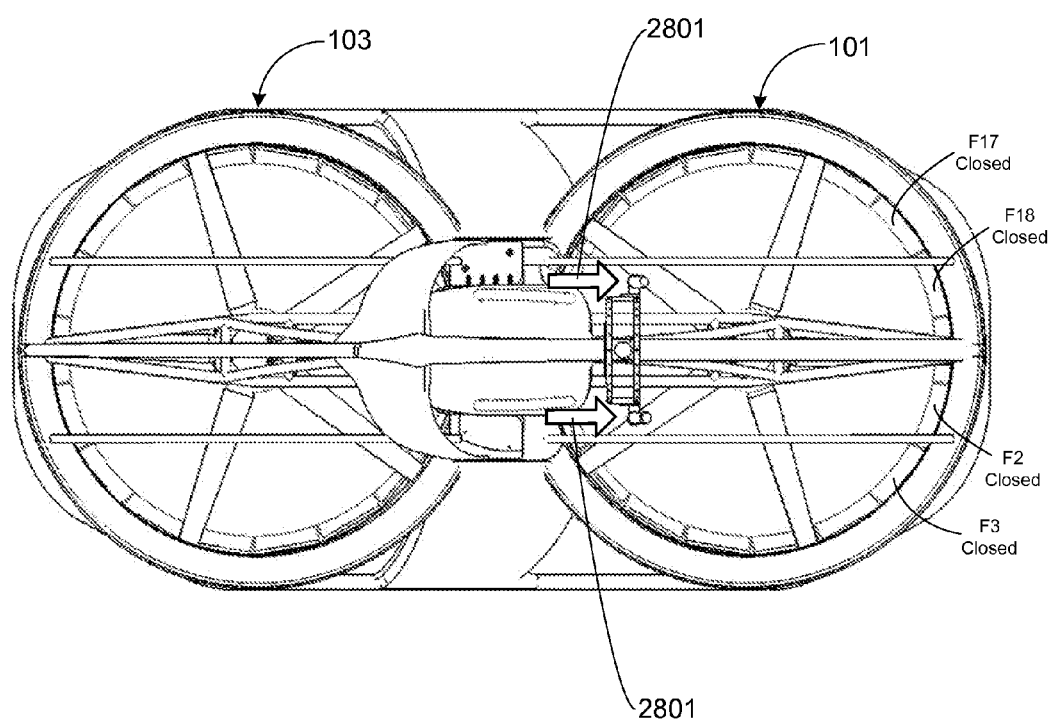
FIG. 28 illustrates the pitch forward input and response.
Figure 29:
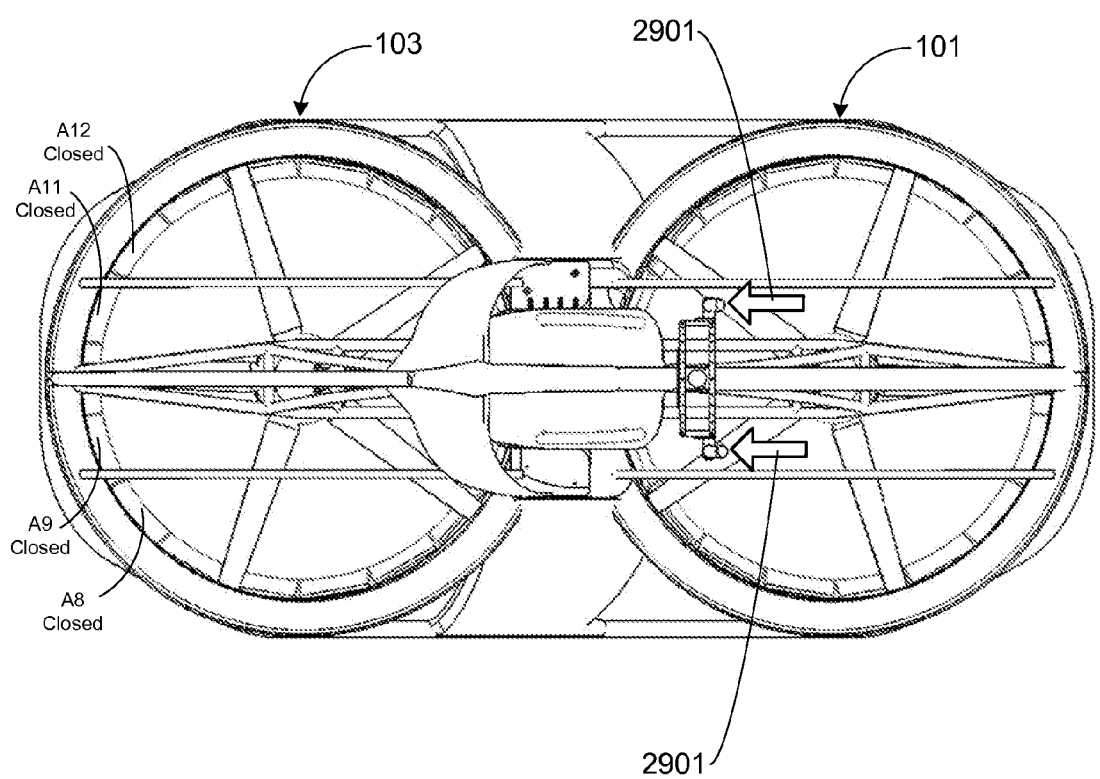
FIG. 29 illustrates the pitch aft input and response.

As illustrated in FIG. 28, when the pilot moves control handle bar 125 forward in a direction 2801, the actuators in control ejector sections F2, F3, F17 and F18 are closed, causing a nose-down pitching moment which rotates the vehicle's thrust vector and accelerates the vehicle forward. Similarly, and as illustrated in FIG. 29, when the pilot pulls back on control handle bar 125 in a direction 2901, the actuators in control ejector sections A8, A9, A11 and A12 are closed, inducing a nose-up pitching moment that rotates the vehicle's thrust vector and decelerates the vehicle, or moves the vehicle aft.

While the above control methodology is preferred, it will be appreciated that minor changes to this methodology may be taken without departing from the invention's kinesthetic control scheme. For example, in an alternate embodiment, pushing forward on control handle bar 125 closes the actuators in ejector sections F2, F3, F4, F16, F17 and F18 while pulling back on control handle bar 125 closes the actuators in ejector sections A7, A8, A9, A11, A12 and A13. By affecting more control sections, this embodiment induces a stronger nose-up or nose-down pitching moment than the prior configuration. In another alternate embodiment, closing of the affected actuators is staggered, thus providing a more gradual introduction of control force. For example in one such alternate embodiment, during a nose-down maneuver initially only ejector sections F2 and F18 are closed, followed by closure of ejector sections F3 and F17, followed by closure of ejector sections F4 and F16. Similar staggering may be used during nose-up maneuvers. Alternately, the control system may be configured such that actuator staggering is dependent upon how far the pilot pushes or pulls the handle bars. In such an embodiment, the further the pilot pushes or pulls control handle bar 125, the greater the number of affected control ejectors.

Figure 30A:
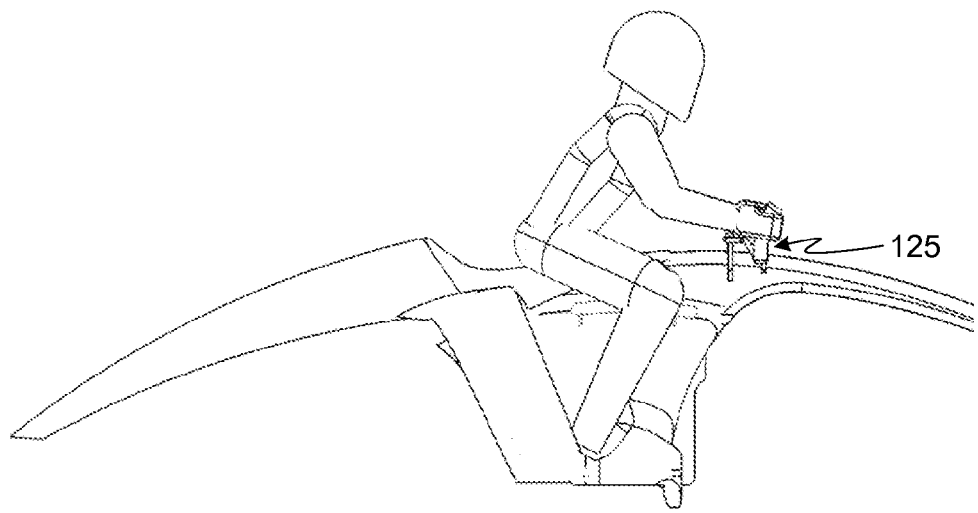
FIG. 30A illustrates the lift platform and pilot in a neutral position.
Figure 30B:
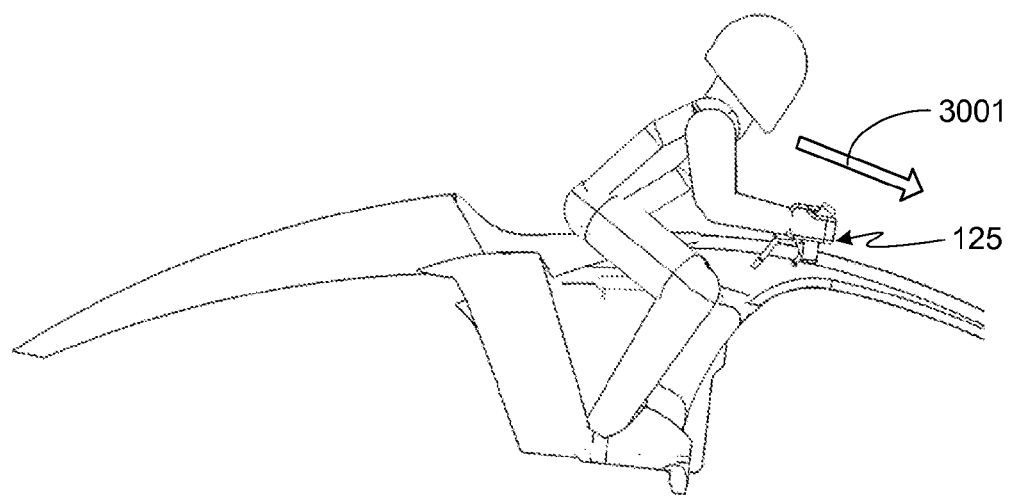
FIG. 30B illustrates the lift platform and pilot commanding a pitch forward maneuver.

The natural tendency of a pilot is to lean forward to go forward, and to lean back to decelerate or stop. The present control system takes advantage of these tendencies. In particular, when the pilot wishes to go forward, they lean forward (FIG. 30B) from a neutral position (FIG. 30A), thereby pushing control handle bar 125 forward in a direction 3001. As a result of this pilot motion, a nose-down pitching moment is introduced that accelerates the vehicle forward. Similarly, when the pilot wishes to decelerate and therefore leans back, they pull handle bar 125 back, introducing a nose-up pitching moment that causes the vehicle to decelerate, or to move backwards if the vehicle is already at a standstill.

Figure 31A:
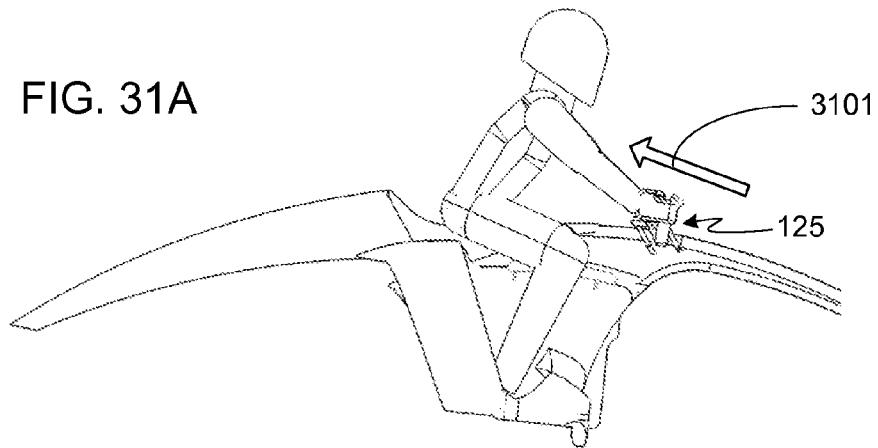
FIG. 31A illustrates platform stabilization when the lift platform begins to pitch nose-down.
Figure 31B:
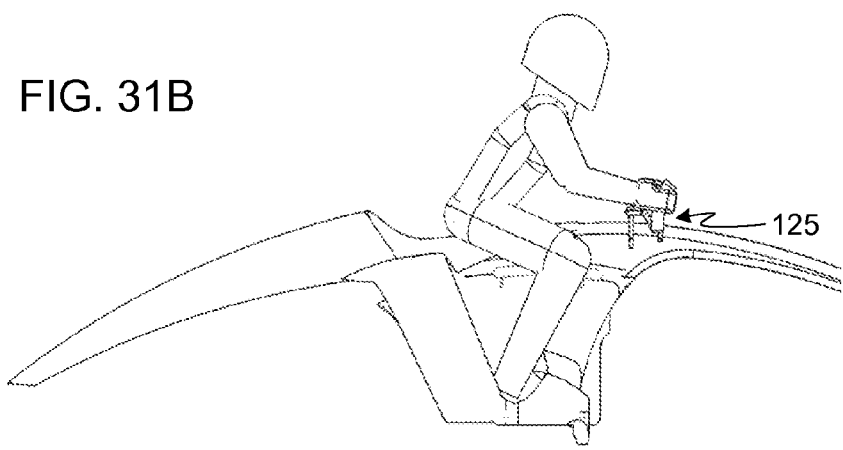
FIG. 31B illustrates the lift platform and pilot in a neutral position.
Figure 31C:
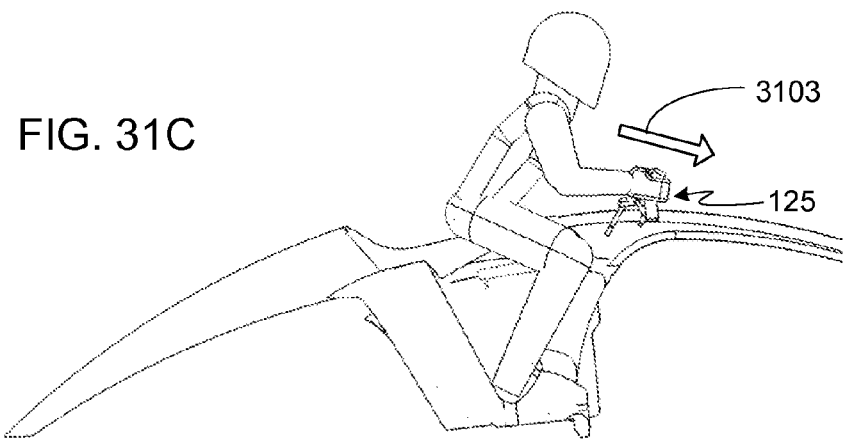
FIG. 31C illustrates platform stabilization when the lift platform begins to pitch nose-up.

In addition to providing a means for commanding nose-down and nose-up maneuvers, control handle bar 125 also provides an inherent stabilizing function. As illustrated in FIG. 31B, in a neutral position the pilot is in an upright position, gripping hand grips 2701 and 2703. When a wind gust or some other destabilizing incident causes the nose of the vehicle to move down (FIG. 31A), the pilot's natural and intuitive response to stay upright causes them to pull back on handle bars 125 in a direction 3101, resulting in a nose-up command that counters the wind gust/incident. Similarly, when a wind gust or other disturbance causes the nose of the vehicle to move up (FIG. 31C), the pilot's intuitive desire to stay upright causes them to push forward on handle bars 125 in a direction 3103, resulting in a nose-down command that counters the incident. Thus the pilot's subconscious responses to unforeseen events, such as wind gusts, correctly counter the destabilizing events.

Yaw

Yaw is controlled by using hand grips 2701/2703 to rotate control handle bars 125 about yaw pivot axis 2713 in much the same way as a bike rider moves a conventional bike handle bar. To minimize undesired pilot movement during yaw commands, the preferred embodiment utilizes a second trailing arm arrangement to form a parallelogram, the parallelogram allowing yaw commands to be initiated without causing hand grips 2701/2703 to rotate relative to the pilot. In the preferred and illustrated arrangement, the parallelogram is comprised of leading yaw link 2715, trailing yaw link 2717, left side link 2719 and right side link 2721. Hand grip 2701 is fixed to side link 2719 and hand grip 2703 is fixed to side link 2721. Due to pivot points 2723, this arrangement rigidly couples the left and right hand grips together while preventing hand grip rotation relative to the pilot during yaw commands. During yaw commands, leading yaw link rotates about pivot axis 2713 and trailing yaw link 2717 rotates about pivot axis 2725, axes 2713 and 2725 being parallel to the vehicle's yaw pivot axis 1805 and in line with the vehicle's longitudinal centerline. Additionally, it will be appreciated that as the present configuration requires that the hand grips move in opposite directions, i.e., pushing left grip 2701 forward and away from the pilot causes right hand grip 2703 to move rearward and towards the pilot, during yaw commands the pilot is not induced to move his/her center of gravity. It should also be appreciated that due to the linkage between hand grips 2701 and 2703 that slaves the two hand grips together, the pilot can initiate yaw commands using either, or both, hand grips. Preferably the leading and trailing yaw links rotate approximately ±20 degrees about the yaw axis. For the preferred configuration, this amount of rotation is equivalent to the hand grips moving fore/aft by approximately ±3 inches. Preferably the amount of control surface movement is linked to the amount the control handle bar 125 is rotated about its yaw pivot axis, thus allowing gradual yaw movements to be generated.

In the preferred embodiment, yaw control is provided by fore-mounted longitudinal control surfaces 129 and aft-mounted longitudinal control surfaces 131. Longitudinal control surfaces 129 and 131 create a force vector that is perpendicular to their length, and in the direction that they are actuated. In the preferred embodiment, the control surfaces are actuated by rotating them about their quarter-chord line. During yaw commands, the fore-mounted longitudinal control surfaces 129 move (i.e., are actuated) in the opposite direction from aft-mounted longitudinal control surfaces 131. As a result, the force vector from one set of longitudinal control surfaces (e.g., surfaces 129) is opposite the force vector from the other set of longitudinal control surfaces (e.g., surfaces 131), causing lift platform 100 to rotate about the vehicle's vertical centerline.

Figure 32A:
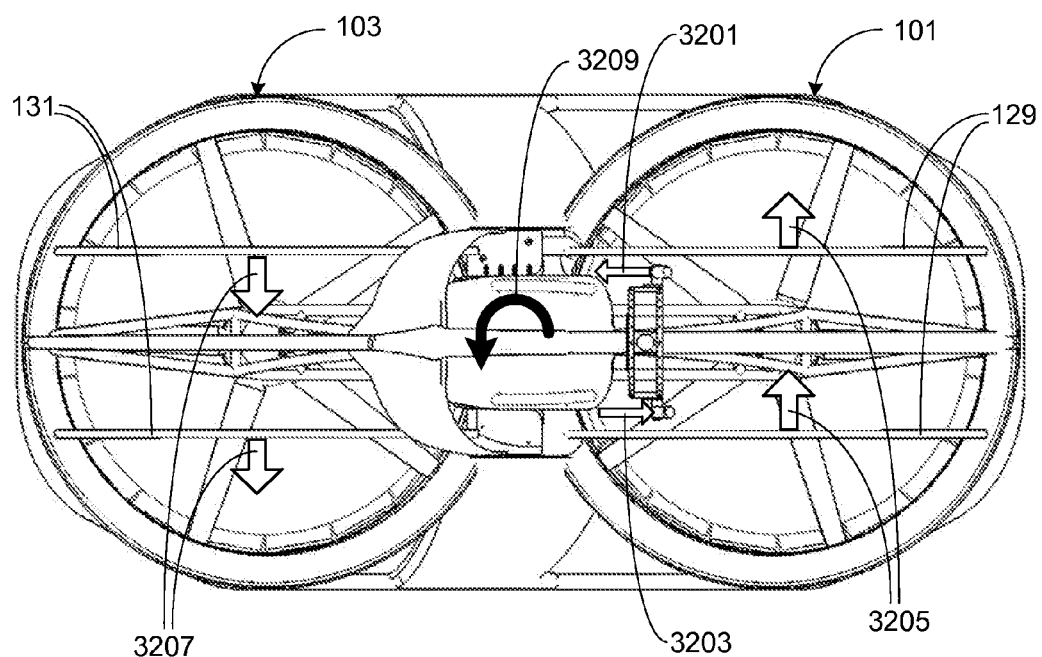
FIG. 32A provides a top view of the lift platform, this view showing a yaw left input command and the resultant response.
Figures 32B, 32C:
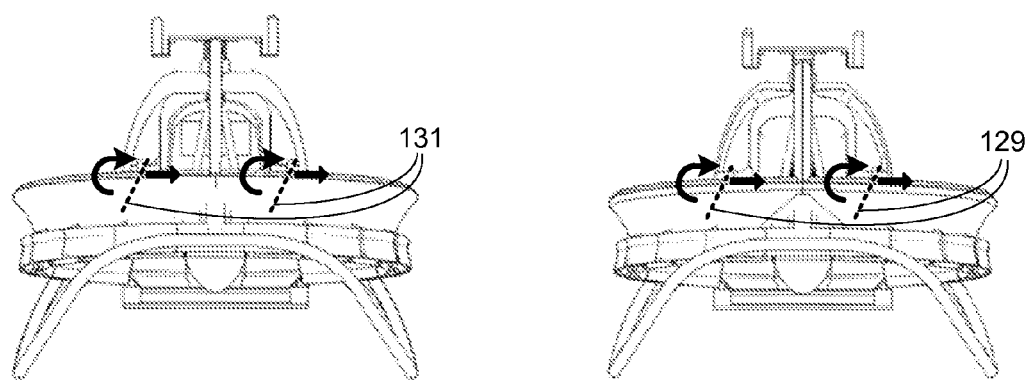
FIG. 32B provides an aft view of the lift platform shown in FIG. 32A.
FIG. 32C provides a fore view of the lift platform shown in FIG. 32A.

As illustrated in FIG. 32A, in order to input a yaw left command the pilot pulls on left hand grip 2701 in a direction 3201 and pushes on right hand grip 2703 in a direction 3203, i.e., rotates control handle bar 125 counterclockwise about a vertical lift platform axis. This command motion causes the leading edge of fore-mounted longitudinal control surfaces 129 to rotate to the left in a direction 3205, and the leading edge of aft-mounted longitudinal control surfaces 131 to rotate to the right in a direction 3207 by the same amount, resulting in a balanced turn to the left about yaw axis 1805 in a direction 3209 due to the perpendicular forces created by the longitudinal control surfaces. FIGS. 32B and 32C provide aft and fore views of the lift platform during a yaw left command, these views showing the rotation of the longitudinal control surfaces.

Figure 33A:
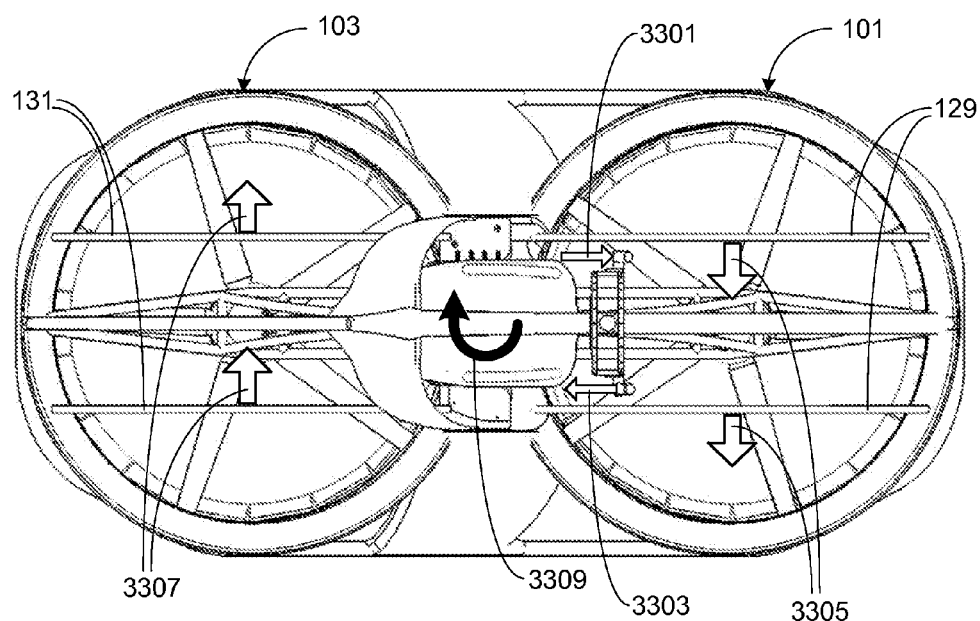
FIG. 33A provides a top view of the lift platform, this view showing a yaw right input command and the resultant response.
Figures 33B, 33C:
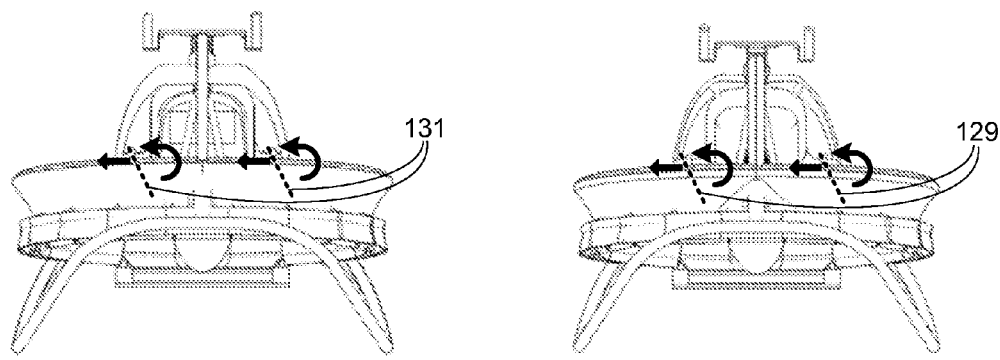
FIG. 33B provides an aft view of the lift platform shown in FIG. 33A.
FIG. 33C provides a fore view of the lift platform shown in FIG. 33A.

FIG. 33A illustrates a yaw right command. As shown, the pilot pushes on left hand grip 2701 in a direction 3301 and pulls on right hand grip 2703 in a direction 3303, i.e., rotates control handle bar 125 clockwise about the vertical lift platform axis, thereby causing the leading edge of fore-mounted longitudinal control surfaces 129 to rotate to the right in a direction 3305 and the leading edge of aft-mounted longitudinal control surfaces 131 to rotate to the left in a direction 3307 by the same amount. As a result, the lift platform makes a balanced turn to the right about yaw axis 1805. FIGS. 33B and 33C provide aft and fore views of the lift platform during a yaw right command, these views showing the rotation of the longitudinal control surfaces.

Control System Modifications

While the preferred embodiment has been described in detail above, it will be appreciated that minor modifications may be made without departing from the benefits of the disclosed kinesthetic control system. For example, and as previously noted, staggering the activation of the actuators within groups of control ejectors may be used as a means of initiating gradual roll maneuvers, or gradual nose-up/nose-down maneuvers. Similarly, and also as described above, the number of the peripheral control ejector actuators that are deployed may be tied to the amount of roll bar movement (i.e., the further the roll bars are moved, the more ejectors that are closed, thus generating a greater roll moment), or the amount of pitch movement (i.e., the further the control handle bar 125 is pushed forward or pulled back, the greater the number of fore or aft ejectors, respectively, that are closed).

Figure 34:
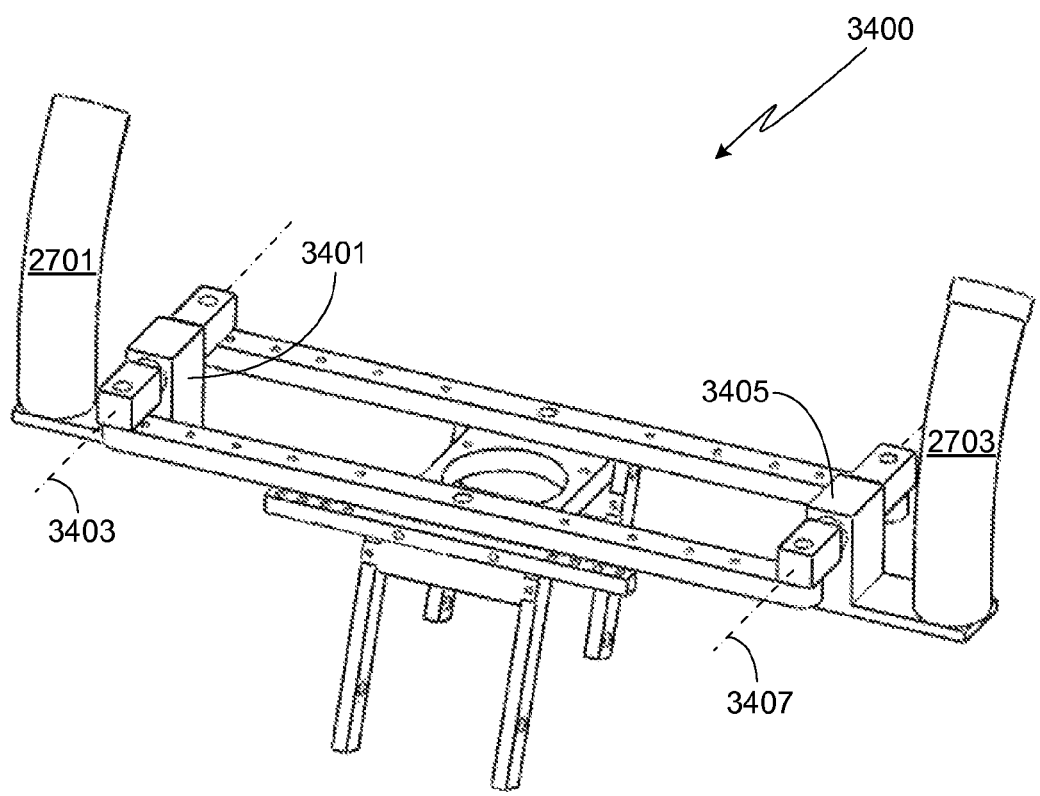
FIG. 34 provides a detailed view of an alternate control handle bar that includes an additional axis of rotation.

FIG. 34 illustrates an alternate control handle bar 3400 which includes an additional axis of motion. Specifically, left hand grip 2701 is attached to the left link 3401 and is free to pivot about axis 3403. Similarly, right hand grip 2703 is attached to the right link 3405 and is free to pivot about axis 3407. In at least one embodiment, the left hand grip 2701 is slaved to the right hand grip 2703 such that pivoting one hand grip about its axis (e.g., axis 3403 or axis 3407) causes the other hand grip to pivot about its axis.

In at least one alternate embodiment, pivoting the hand grips about their axes (e.g., axes 3403 and 3407) affects the roll ejectors in the same manner as roll bars 127 affect the roll ejectors. As such, pivoting the hand grips provides another method of initiating a roll.

In at least one alternate embodiment, pivoting the hand grips about their axes (e.g., axes 3403 and 3407) affects a different set of roll ejectors, thus allowing the hand control to provide auxiliary roll control. For example, roll left command made by roll bars 127 may close left side actuators A15, A16, F13 and F14 while inputting a roll left command by the hand grips may close left side actuators A17 and F12, and/or A14 and F15. Similarly, a roll right command made by roll bars 127 may close right side actuators A4, A5, F6 and F7 while inputting a roll right command by the hand grips may close right side actuators A3 and F8, and/or A6 and F5.

Figure 35A:
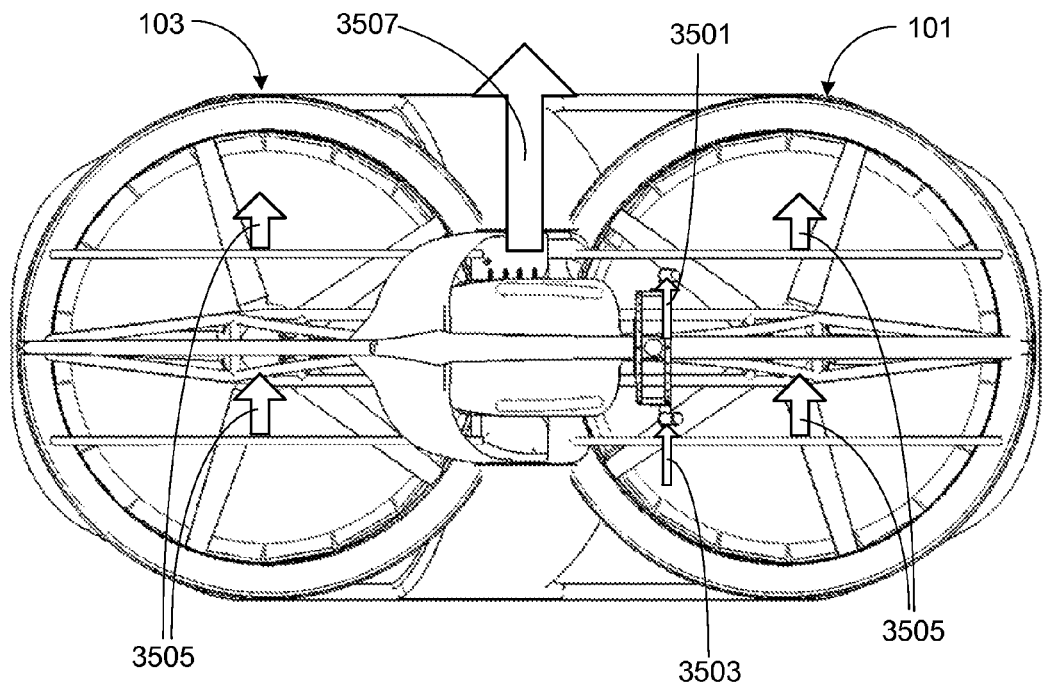
FIG. 35A provides a top view of the lift platform, this view showing a translate left input command and the resultant response.
Figures 35B, 35C:
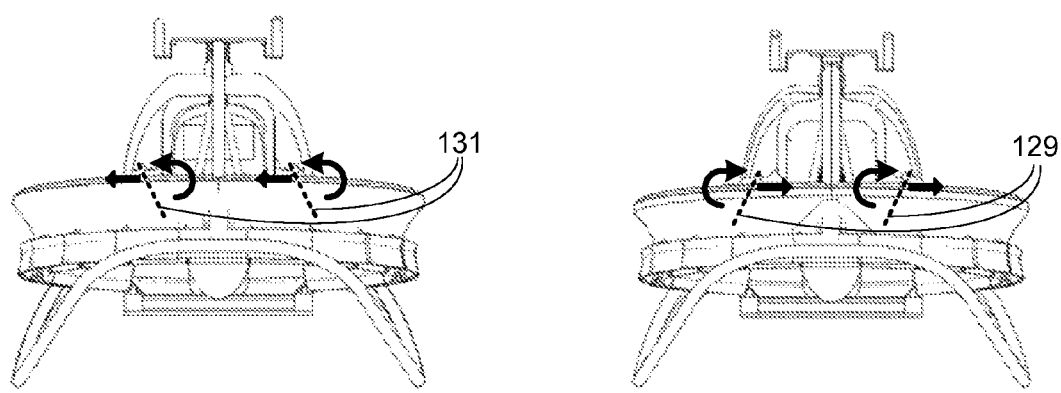
FIG. 35B provides an aft view of the lift platform shown in FIG. 35A.
FIG. 35C provides a fore view of the lift platform shown in FIG. 35A.

In at least one alternate embodiment, pivoting the hand grips about their axes (e.g., axes 3403 and 3407) affects the longitudinal control surfaces 129 and 131. However, unlike yaw control, actuating the longitudinal control surfaces via the hand grips causes both the fore and aft longitudinal control surfaces to move in the same direction, thereby causing the lift platform to translate to the left or right. For example, and as illustrated in FIG. 35A, in order to input a left translation command the pilot pivots left hand grip 2701 in a direction 3501 about axis 3403 and pivots right hand grip 2703 in a direction 3503 about axis 3407. This command motion causes the leading edge of fore-mounted longitudinal control surfaces 129 and the leading edge of aft-mounted longitudinal control surfaces 131 to rotate to the left in a direction 3505, resulting in a left translation of lift platform 100 in a direction 3507. FIGS. 35B and 35C provide aft and fore views of the lift platform during the left translation command. Similarly, and as illustrated in FIG. 36A, in order to input a right translation command the pilot pivots left hand grip 2701 in a direction 3601 about axis 3403 and pivots right hand grip 2703 in a direction 3603 about axis 3407. This command motion causes the leading edge of fore-mounted longitudinal control surfaces 129 and the leading edge of aft-mounted longitudinal control surfaces 131 to rotate to the right in a direction 3605, resulting in a right translation of lift platform 100 in a direction 3607. FIGS. 36B and 36C provide aft and fore views of the lift platform during the left translation command.

In at least one alternate embodiment, the four links used to form the parallelogram of the yaw are replaced with a single handle bar arrangement that rigidly couples left hand grip 2701 to right hand grip 2703. It will be appreciated that while the preferred four link configuration removes hand grip rotation relative to the pilot during yaw commands, the use of a single handle bar cross link eliminates this benefit. Accordingly in this embodiment preferably each hand grip is comprised of a cylindrical grip surrounding an inner member whereby the exterior cylindrical grip is free to rotate about the inner member.

In at least one embodiment, the control handle bar further includes a squeeze lever (similar to the brake lever used to control the brakes on a conventional bicycle) attached to one of the hand grips, or a pair of squeeze levers with one attached to each hand grip. Preferably the squeeze levers are used to control a feature of the lift platform that is only rarely used. For example, the squeeze lever(s) may be used to actuate all aft pitch ejectors, thus providing an alternative means of rapidly decelerating. Alternately, the squeeze lever(s) may be used to actuate all ejectors, thus providing a simple means for thrust reduction, for example for use during descent, or to allow engine throttle up without take-off.

It should be understood that there are a variety of techniques that may be employed to control/throttle engine power, and that the present control system is not limited to a specific power control/throttle. In an exemplary configuration, a thumb wheel 2725 is located on the top of the right grip as shown. Rotation of thumb wheel 2725, for example by the pilot's thumb and/or forefinger, allows power to be throttled. Preferably 2725 is positioned slightly above the relaxed position of the thumb and forefinger, thus allowing the remaining three fingers to remain in position, grasping the hand grip, while still allowing throttle control. Clearly other means, such as a trigger controller, throttle up/down buttons, etc. may be used to adjust and control motor output power.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A vehicle with a kinesthetic control system, comprising:
   a lift platform comprising a first rotor mounted within a first duct and located in a fore position in said lift platform, a second rotor mounted within a second duct and located in an aft position in said lift platform, wherein said first and second positions are longitudinally spaced, wherein said first and second positions are centered on a lift platform centerline, wherein a first lift plane defined by said first rotor is below a lift platform center of gravity, and wherein a second lift plane defined by said second rotor is below said lift platform center of gravity;

means for altering air flow through said first and second ducts;

a control handle bar coupled to said means, said control handle bar comprising a linkage assembly, a left hand grip and a right hand grip slaved to said left hand grip, wherein forward movement from a neutral position of said control handle bar along said lift platform centerline adjusts said means to generate a nose-down pitching moment, wherein rearward movement from said neutral position of said control handle bar along said lift platform centerline adjusts said means to generate a nose-up pitching moment, wherein counterclockwise movement from said neutral position of said control handle bar about a vertical lift platform axis adjusts said means to generate a counterclockwise rotation of said lift platform about a lift platform vertical centerline, and wherein clockwise movement from said neutral position of said control handle bar about said vertical lift platform axis adjusts said means to generate a clockwise rotation of said lift platform about said lift platform vertical centerline; and a first control roll bar located on a left side of a central cowling of said lift platform and a second control roll bar located on a right side of said central cowling of said lift platform, wherein said first and second control roll bars are longitudinally oriented, wherein said first and second control roll bars are rigidly fixed to one another, wherein said first and second control roll bars are coupled to said means, wherein movement of said first and second control roll bars in a vehicle left direction from a roll bar neutral position adjusts said means to generate a roll left moment about a lift platform roll axis, and wherein movement of said first and second control roll bars in a vehicle right direction from said roll bar neutral position adjusts said means to generate a roll right moment about said lift platform roll axis.

2. The vehicle of claim 1, wherein said means is comprised of a first airflow augmentation system corresponding to said first duct and a second airflow augmentation system corresponding to said second duct, wherein each of said first and second airflow augmentation systems comprise:

an inner cowling member, wherein said inner cowling member is mechanically mounted to an inside duct surface of a duct trailing edge via a plurality of inner cowling stand-offs, wherein said inner cowling member is mounted within the downwash of a duct propeller, and wherein a trailing edge of said inner cowling member extends below said duct trailing edge;

an outer cowling member, wherein said outer cowling member is mechanically mounted to an outside duct surface of said duct trailing edge via a plurality of outer cowling stand-offs, and wherein a trailing edge of said outer cowling member extends below said duct trailing edge; and a plurality of actuators, wherein each of said plurality of actuators is mounted between said trailing edge of said inner cowling member and said trailing edge of said outer cowling member, wherein each of said plurality of actuators may be positioned within at least two positions comprised of an open position and a closed position, wherein an actuator in said open position provides minimal profile to airflow passing between said inner cowling member and said duct, and wherein said actuator in said closed position redirects airflow entering between said inner cowling member and said duct outboard between said outer cowling member and said duct.

3. The vehicle of claim 2, further comprising a plurality of ejector cavities, wherein each ejector cavity of said plurality of ejector cavities is comprised of a portion of said inner cowling member and a portion of said outer cowling member, wherein adjacent ejector cavities are separated by a combination of one of said plurality of inner cowling stand-offs and one of said plurality of outer cowling stand-offs, and wherein at least one actuator of said plurality of actuators corresponds to each ejector cavity of said plurality of plurality of ejector cavities.

4. The vehicle of claim 2, wherein each of said plurality of actuators has a curvilinear shape.

5. The vehicle of claim 4, wherein a cylindrical axis corresponding to said curvilinear shape is parallel to a downward vector corresponding to primary airflow when said actuator is in said open position.

6. The vehicle of claim 2, wherein each of said plurality of actuators is comprised of a first actuator surface hingeably coupled to said inner cowling member and a second actuator surface hingeably coupled to said outer cowling member.

7. The vehicle of claim 2, further comprising a control system coupled to said plurality of actuators and to said control handle bar, wherein forward movement of said control handle bar from said neutral position along said lift platform centerline causes a first subset of said plurality of actuators corresponding to said first duct to close and generate said nose-down pitching moment, and wherein rearward movement of said control handle bar from said neutral position along said lift platform centerline causes a second subset of said plurality of actuators corresponding to said second duct to close and generate said nose-up pitching moment.

8. The vehicle of claim 7, wherein said first subset of said plurality of actuators are located forward of a first rotor centerline corresponding to said first duct, and wherein said second subset of said plurality of actuators are located aft of a second rotor centerline corresponding to said second duct.

9. The vehicle of claim 2, further comprising a control system coupled to said plurality of actuators and to said first and second control roll bars, wherein movement of said first and second control roll bars in said vehicle left direction from said roll bar neutral position causes a first subset of said plurality of actuators corresponding to said first duct and a second subset of said plurality of actuators corresponding to said second duct to close and generate said roll left moment about said lift platform roll axis, and wherein movement of said first and second control roll bars in said vehicle right direction from said roll bar neutral position causes a third subset of said plurality of actuators corresponding to said first duct and a fourth subset of said plurality of actuators corresponding to said second duct to close and generate said roll right moment about said lift platform roll axis.

10. The vehicle of claim 9, wherein said first and second subsets of said plurality of actuators are located to the left of said lift platform centerline, and wherein said third and fourth subsets of said plurality of actuators are located to the right of said lift platform centerline.

11. The vehicle of claim 9, wherein said left hand grip is pivotable in a left direction and in a right direction relative to said lift platform centerline and relative to said linkage assembly, wherein said right hand grip is pivotable in said left direction and in said right direction relative to said lift platform centerline and relative to said linkage assembly, wherein said vehicle further comprises a second control system coupled to said plurality of actuators and to said left and right hand grips, wherein pivoting said left and right hand grips in said left direction causes a fifth subset of said plurality of actuators corresponding to said first duct and a sixth subset of said plurality of actuators corresponding to said second duct to close and generate an auxiliary roll left moment about said lift platform roll axis, and wherein pivoting said left and right hand grips in said right direction causes a seventh subset of said plurality of actuators corresponding to said first duct and an eighth subset of said plurality of actuators corresponding to said second duct to close and generate an auxiliary roll right moment about said lift platform roll axis.

12. The vehicle of claim 2, wherein said left hand grip is pivotable in a left direction and in a right direction relative to said lift platform centerline and relative to said linkage assembly, wherein said right hand grip is pivotable in said left direction and in said right direction relative to said lift platform centerline and relative to said linkage assembly, wherein said vehicle further comprises a control system coupled to said plurality of actuators and to said left and right hand grips, wherein pivoting said left and right hand grips in said left direction causes a first subset of said plurality of actuators corresponding to said first duct and a second subset of said plurality of actuators corresponding to said second duct to close and generate said roll left moment about said lift platform roll axis, and wherein pivoting said left and right hand grips in said right direction causes a third subset of said plurality of actuators corresponding to said first duct and a fourth subset of said plurality of actuators corresponding to said second duct to close and generate said roll right moment about said lift platform roll axis.

13. The vehicle of claim 12, wherein said first and second subsets of said plurality of actuators are located to the left of said lift platform centerline, and wherein said third and fourth subsets of said plurality of actuators are located to the right of said lift platform centerline.

14. The vehicle of claim 1, wherein said means is comprised of at least a pair of rotatable fore-mounted longitudinal control surfaces mounted above said first duct and at least a pair of aft-mounted rotatable longitudinal control surfaces mounted above said second duct, wherein said vehicle further comprises a control system coupled to said fore-mounted and aft-mounted longitudinal control surfaces and to said control handle bar, wherein counterclockwise movement of said control handle bar causes a leading edge of said fore-mounted longitudinal control surfaces to rotate to the left and causes a leading edge of said aft-mounted longitudinal control surfaces to rotate to the right, and wherein clockwise movement of said control handle bar causes said leading edge of said fore-mounted longitudinal control surfaces to rotate to the right and causes said leading edge of said aft-mounted longitudinal control surfaces to rotate to the left.

15. The vehicle of claim 14, wherein a first control surface of said fore-mounted longitudinal control surfaces is mounted to the left of said lift platform centerline and a second control surface of said fore-mounted longitudinal control surfaces is mounted to the right of said lift platform centerline, and wherein a first control surface of said aft-mounted longitudinal control surfaces is mounted to the left of said lift platform centerline and a second control surface of said aft-mounted longitudinal control surfaces is mounted to the right of said lift platform centerline.

16. The vehicle of claim 14, wherein said left hand grip is pivotable in a left direction and in a right direction relative to said lift platform centerline and relative to said linkage assembly, wherein said right hand grip is pivotable in said left direction and in said right direction relative to said lift platform centerline and relative to said linkage assembly, wherein said vehicle further comprises a second control system coupled to said fore-mounted and aft-mounted longitudinal control surfaces and to said left and right hand grips, wherein pivoting said left and right hand grips in said left direction causes said leading edge of said fore-mounted and aft-mounted longitudinal control surfaces to rotate to the left to generate a translate left moment, and wherein pivoting said left and right hand grips in said right direction causes said leading edge of said fore-mounted and aft-mounted longitudinal control surfaces to rotate to the right to generate a translate right moment.

17. The vehicle of claim 1, further comprising a drive system coupled to said first and second rotors, a throttle controller coupled to the drive system and mounted to at least one of said left hand grip and said right hand grip, a pair of foot support plates, and wherein said central cowling defines a pilot seating region.

18. The vehicle of claim 1, wherein a first roll bar linkage assembly is coupled to said first control roll bar and a second roll bar linkage assembly is coupled to said second control roll bar, wherein said first roll bar linkage assembly passes through a left side portion of said central cowling to position said first control roll bar at approximately pilot knee height, and wherein said second roll bar linkage assembly passes through a right side portion of said central cowling to position said second control roll bar at approximately pilot knee height.

19. The vehicle of claim 1, wherein said linkage assembly of said control handle bar further comprises a pair of leading arms and a pair of trailing arms, and wherein said linkage assembly prevents an angle between said left and right hand grips and a lift platform plane to vary as said control handle bar is moved forward and rearward from said neutral position.

20. The vehicle of claim 1, wherein said linkage assembly of said control handle bar further comprises a leading yaw link, a trailing yaw link, a left side link to which said left hand grip is affixed, and a right side link to which said right hand grip is affixed, and wherein said linkage assembly prevents left and right hand grip rotation as said control handle bar is moved counterclockwise from said neutral position and clockwise from said neutral position.

* * * * *